(12) United States Patent
Miyajima

(10) Patent No.: US 9,849,897 B2
(45) Date of Patent: Dec. 26, 2017

(54) SIGNALING SYSTEM AND CONTROL METHOD OF MOVING VEHICLE

(71) Applicant: MITSUBISHI HEAVY INDUSTRIES, LTD., Tokyo (JP)

(72) Inventor: Yutaka Miyajima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/779,401

(22) PCT Filed: Mar. 29, 2013

(86) PCT No.: PCT/JP2013/059730
§ 371 (c)(1),
(2) Date: Sep. 23, 2015

(87) PCT Pub. No.: WO2014/155728
PCT Pub. Date: Oct. 2, 2014

(65) Prior Publication Data
US 2016/0046307 A1    Feb. 18, 2016

(51) Int. Cl.
*G05D 1/00*    (2006.01)
*G05D 3/00*    (2006.01)
(Continued)

(52) U.S. Cl.
CPC .......... *B61L 27/0011* (2013.01); *B60L 15/40* (2013.01); *B61L 15/0072* (2013.01); *B61L 23/20* (2013.01);
(Continued)

(58) Field of Classification Search
CPC ... B61L 27/0011; B61L 27/00; B61L 27/0005
See application file for complete search history.

(56) References Cited

U.S. PATENT DOCUMENTS

2006/0195236 A1   8/2006  Katsuta et al.
2012/0323411 A1*  12/2012 Whitwam ............... B61L 21/10
                                                701/19
(Continued)

FOREIGN PATENT DOCUMENTS

JP     2000-168556 A    6/2000
JP     2002-331936 A   11/2002
(Continued)

OTHER PUBLICATIONS

PCT, "International Search Report for International Application No. PCT/JP2013/059730".

(Continued)

*Primary Examiner* — Imran Mustafa
(74) *Attorney, Agent, or Firm* — Manabu Kanesaka; Benjamin Hauptman; Kenneth Berner

(57) ABSTRACT

A signaling system includes an on-board device provided for a moving vehicle traveling on a track, and a station interface device provided for a station, and a branch provided on the track. A second moving vehicle transmits different moving vehicle related data of itself to a first on-board device of a first moving vehicle. The first station interface device transmits station related data of the branch to the first on-board device. The first on-board device outputs a command which instructs to switch the branch, to the first station interface based on the different moving vehicle related data and the station related data, to secure the traveling route. The first station interface device switches the branch and secures the traveling route. The first on-board device determines the traveling of the first moving vehicle of the secured traveling route based on the different moving vehicle related data.

8 Claims, 18 Drawing Sheets

(51) Int. Cl.
| | |
|---|---|
| G06F 7/00 | (2006.01) |
| G06F 17/00 | (2006.01) |
| B61L 27/00 | (2006.01) |
| B60L 15/40 | (2006.01) |
| B61L 15/00 | (2006.01) |
| B61L 23/20 | (2006.01) |

(52) U.S. Cl.
CPC ....... *B61L 27/0005* (2013.01); *B61L 27/0038* (2013.01); *B61L 27/0077* (2013.01); *B60L 2200/26* (2013.01)

(56) References Cited

U.S. PATENT DOCUMENTS

| | | | | |
|---|---|---|---|---|
| 2014/0188375 | A1* | 7/2014 | Kumar | B60L 15/38 701/117 |
| 2014/0209755 | A1 | 7/2014 | Takahashi et al. | |

FOREIGN PATENT DOCUMENTS

| | | | |
|---|---|---|---|
| JP | 2004-133585 | A | 4/2004 |
| JP | 2006-137337 | A | 6/2006 |
| JP | 2006-232106 | A | 9/2006 |
| JP | 2010-228688 | A | 10/2010 |
| JP | 2011-20578 | A | 2/2011 |
| JP | 2012-96704 | A | 5/2012 |
| JP | 2012-131324 | A | 7/2012 |

OTHER PUBLICATIONS

Related PCT Application, "International Search Report for International Application No. PCT/JP2013/05741".
Related PCTApplication, "International Search Report for International Application No. PCT/JP2013/059721".
PCT/IB/338, "Notification of Transmittal of Translation of the International Preliminary Report on Patentability for International Application No. PCT/JP2013/059721," dated Oct. 8, 2015.
PCT/IB/373, "International Preliminary Report on Patentability for International Application No. PCT/JP2013/059721," dated Sep. 29, 2015.
PCT/IB/237, "Written Opinion of the International Searching Authority for International Application No. PCT/JP2013/059721," dated Jun. 25, 2013.
PCT/IB/326, "Notification Concerning Transmittal of International Preliminary Report on Patentability for International Application No. PCT/JP2013/059721," dated Oct. 8, 2015.
PCT/IB/338, "Notification of Transmittal of Translation of the International Preliminary Report on Patentability for International Application No. PCT/JP2013/059730," dated Oct. 8, 2015.
PCT/IB/373, "International Preliminary Report on Patentability for International Application No. PCT/JP2013/059730," dated Sep. 29, 2015.
PCT/ISA/237, "Written Opinion of the International Searching Authority for International Application No. PCT/JP2013/059730," dated Jun. 25, 2013.
PCT/IB/326, "Notification Concerning Transmittal of International Preliminary Report on Patentability for International Application No. PCT/JP2013/059730," dated Oct. 8, 2015.
PCT/IB/338, "Notification of Transmittal of Translation of the International Preliminary Report on Patentability for International Application No. PCT/JP2013/059741," dated Oct. 8, 2015.
PCT/IB/373, "International Preliminary Report on Patentability for International Application No. PCT/JP2013/059741," dated Sep. 29, 2015.
PCT/ISA/237, "Written Opinion of the International Searching Authority for International Application No. PCT/JP2013/059741," Jun. 25, 2013.
PCT/IB/326, "Notification Concerning Transmittal of International Preliminary Report on Patentability for International Application No. PCT/JP2013/059741," dated Oct. 8, 2015.
Singapore Patent Office, "Decision to Grant a Patent for Singaporean Patent Application No. 11201507765U," dated Jan. 11, 2016.
Singapore Patent Office, "Decision to Grant a Patent for Singaporean Patent Application No. 11201507768V," dated Jul. 20, 2016.
Singapore Patent Office, "Decision to Grant a Patent for Singaporean Patent Application No. 11201507745Q," dated Jul. 14, 2016.
United States Patent and Trademark Office, "Office Action for U.S. Appl. No. 14/780,094" dated Apr. 8, 2016.
United States Patent and Trademark Office, "Notice of Allowance for U.S. Appl. No. 14/780,094" dated Aug. 12, 2016.
Japan Patent Office, "Decision to Grant a Patent for Japanese Patent Application No. 2015-507912" dated Dec. 13, 2016.
USPTO, "Final Office Action for U.S. Appl. No. 14/779,956," dated Aug. 2, 2017.

\* cited by examiner

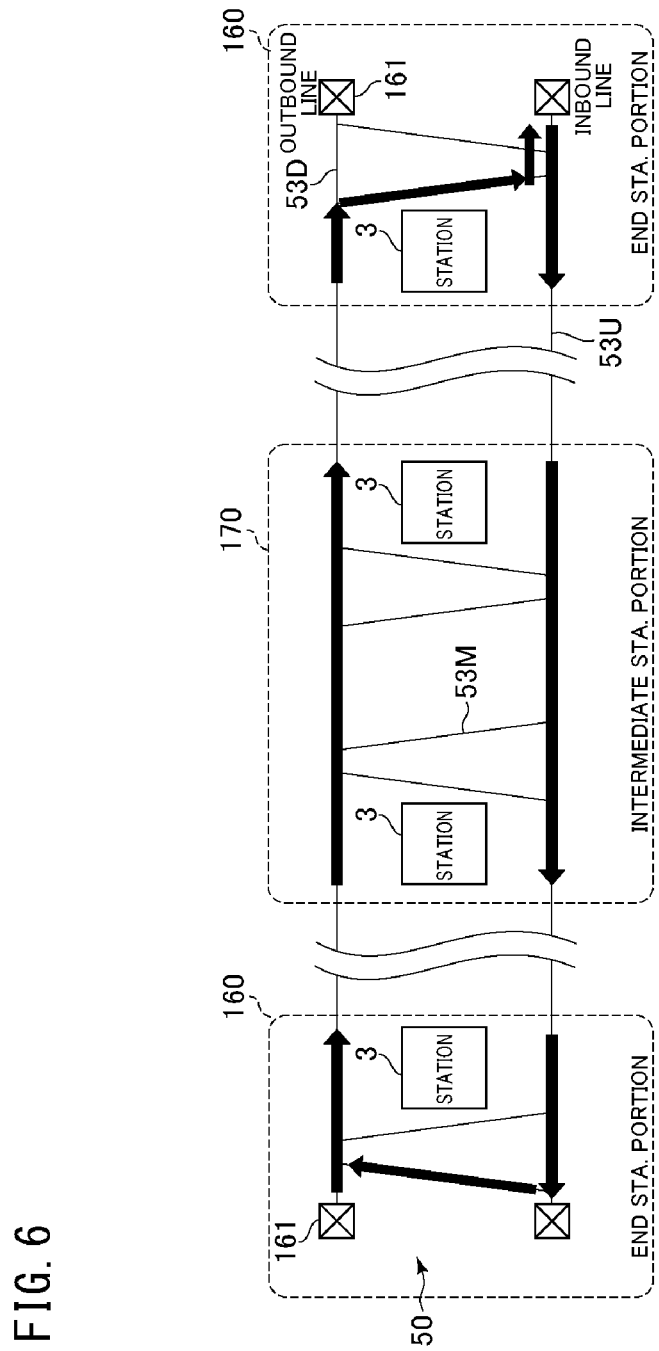

SIGNALING SYSTEM AND CONTROL METHOD OF MOVING VEHICLE

RELATED APPLICATIONS

The present application is National Phase of International Application No. PCT/JP2013/059730 filed Mar. 29, 2013, the disclosure of which is hereby incorporated by reference herein in its entirety.

TECHNICAL FIELD

The present invention relates to a signaling system and a control method of a moving vehicle, and especially, to a signaling system for a moving vehicle traveling on a track and a control method of the moving vehicle.

BACKGROUND ART

A moving vehicle (a train) traveling on a track as in a new transportation system and a railway is known. A signaling system which controls the traveling of such a moving vehicle is known. The conventional signaling system is of a central supervisory control-type. In the central supervisory control-type signaling system, devices for a main safety function (a protection function) are concentrates in a control center and the traveling states of trains in a whole railroad division are grasped and managed, in order to realize a function safety. The devices for the safety function (protection devices) contain an interlocking device, an ATP (Automatic Train Protection) ground device, and a station control device.

FIG. 1 is a block diagram showing a configuration of the conventional signaling system. This signaling system is divided into a control center, (a group of) trains, stations and railroad tracks. The control center grasps and manages the operation states of trains in the whole railroad division, to realize the function safety. The control center contains an operation control device 230, an ATP ground device 232, a station control device 234 and an interlocking device 236. The respective devices are mutually connected by an exclusive-use LAN (Local Area Network) 238 to be bi-directionally communicable. The operation control device 230 controls the whole operation. The interlocking device 236 carries out the protection of traveling routes of the trains. The ATP ground device 232 prevents a collision between the trains. The station control device 234 attains the function safety of the control of the opening/closing of platform screen doors and train doors at a station.

Each of the (group of) trains is provided with an on-board device 210. The on-board device 210 controls the operation of the train based on the control of the control center. The on-board device 210 is connected with the ATP ground device 232 by the exclusive-use LAN 238 to be bi-directionally communicable. The station is provided with a remote I/O 220. The remote I/O 220 carries out the opening/closing control of the platform screen door 240 and the control of railroad switches 250 on the railroad track based on the control of the control center. The remote I/O 220 is connected with the station control device 234 and the interlocking device 236 by an exclusive-use LAN to be bi-directionally communicable.

The operation of this conventional signaling system (the operation of a train) becomes as described below, for example.

When a departure time of an optional train comes gets closer based on the train diagram, the operation control device 230 refers to the on-rail state 205 from the ATP ground device 232 to check the on-rail state in the railroad division. When determining that the on-rail state indicates that the train is possible to depart, the operation control device 230 issues a departure command (or a traveling route request) 206 to the train.

When receiving the departure command (or the traveling route request) 206, the interlocking device 236 refers to the on-rail state 205 in the railroad division to be received from the ATP ground device 232 at a constant period and issues a command to the remote I/O 220 such that the railroad switches (branches) 250 in an object section for which the train travels, become coincident with the direction of a traveling route. The remote I/O 220 controls the railroad switches (branches) 250 in the object section for which the train travels, to be switched to the traveling route direction. The interlocking device 236 locks the railroad switches (branches) 250 after the switching. As a result, the traveling route of the train is exclusively established (traveling route control 201). The other train never travels on the traveling route. The interlocking device 236 outputs the state of such a traveling route to the ATP ground device 232 at a constant period as a traveling route state 207.

The ATP ground device 232 always monitors a train position by using a latest train position 204 received from detectors arranged on the railroad track and the train. The ATP ground device 232 outputs the on-rail state 205 in the railroad division which is based on the monitoring result, to the interlocking device 236 at a constant period. Also, the ATP ground device 232 refers to the traveling route state 207 received from the interlocking device 236 at a constant period, outputs a traveling permission 202 to the train for which the traveling route is established, while considering to keep a safety distance from a preceding train. The train generates a speed profile to a traveling permission limit position when receiving the traveling permission 202, and starts to travel under the speed control to be carried out while referring to the profile.

The station control device 234 receives a train state 208 (the state in which the operation is perfectly stopped and a brake is working) through the ATP ground device 232, after the train has arrived at a station. At the same time, the station control device 234 checks a door state of a platform screen door 240 through the remote I/O 220. After it is confirmed that it is possible to open doors of the train and the platform screen door 240, the station control device 234 issues a door opening command 203 to (the on-board device 210 of) the train through the ATP ground device 232. At the same time, the station control device 234 issues a door opening command 203 to the platform screen door 240 through the remote I/O 220.

In this way, in the conventional signaling system, for example, the traveling route control is carried out by the interlocking device 236 to establish the traveling route of the train, and the train interval protection for issuing the traveling permission of the train is carried out by the ATP ground device 232. In other words, in the conventional signaling system, the traveling route control and the train interval protection are carried out by different systems.

This method is a method proved based on results but having a problem described below. For example, the method has a processing system in which the protection functions are independent from each other, as mentioned above. Therefore, the conventional signaling system has a redundant configuration. Therefore, considering the system configuration while paying attention to the safety of the signaling system, it is not possible to step out from the above configuration and there is a limit in the cost reduction.

Also, when the signaling system is introduced, the operation control device 230, the interlocking device 236, the ATP ground device 232, and the station control device 234 become necessary to control the operations of all the trains in the whole railroad division regardless of a railroad division scale and the details of the train operation. These are a minimum configuration when the signaling system is configured, and there is a limit in reduction of an introduction cost.

Especially, the operation control device 230, the ATP ground device 232, control device 234 and the interlocking device 236 control the operations of all the trains in the whole railroad division. Therefore, each device is allocated with a very large load. For this reason, each device is extremely large in size and is expensive. Therefore, a technique is demanded in which a space for the device can be reduced, an introduction cost can be reduced, and the handling is easy.

Moreover, in a conventional signaling system, 3 devices having independent functions of a departure and arrival control, a traveling route establishment, and a traveling permission control for a train are made cooperate, to issue a traveling command to the train. For this reason, the paths of data transfer necessary for a sequence control increase so that a process until the traveling command is outputted to the train takes much time. As a result, it takes much time for the train to leave a station, which gives an influence on a transportation capacity. A technique of reducing the time for the train to leave is required.

As a related art, JP 2012-96704A discloses a radio train control system and a radio train control method. The radio train control system includes a central device, a station control device provided for each railroad station and connected with the central device to be communicable, an on-board device provided in each train and connected with the station control device to be radio-communicable in a radio communication area of a station and a periphery of the station. In this radio train control system, the on-board device includes transmission means for transmitting position information to the station control device. The station control device includes main operation means for receiving the position information from the on-board device, storing on-rail information showing that the train is on a rail every partitioning section, transmitting the on-rail information to the central device, receiving instruction information from the central device, and controlling devices in the station based on the instruction information. The central device includes main operation means for determining a traveling permission range of each train based on the on-rail information received from the station control device and transmitting instruction information to the station control device. Moreover, the station control device further includes advance data storing means for setting advance data showing that the train advanced into the station, to a inerasable state when cannot be normally communicated with the central device. The central device includes return means for receiving all the advance data from the station control device and returning to a main use operation from a temporary use operation after the partitioning sections where all the trains are present are determined.

Also, JP 2012-131324A discloses an operation security method and an operation security system. The operation security method is a method by the operation security system which includes 1) a control device which manages an occupation state in each closed section, 2) a railroad switch control device which controls a railroad switch, and 3) an on-board device which is loaded into a train and carries out an interlocking control of the configuration of a traveling schedule route based on each closed section and position information of the railroad switch. The method includes a securement request step in which the on-board device transmits a securement request signal to the control device to request the occupation securement of the closed sections of a traveling schedule route; an occupation securing step in which the control device carries out a determination of whether or not all of the closed sections of the traveling schedule route meet a predetermined occupation possible condition, based on the securement request signal, sets all the closed sections to occupation existence when meeting the predetermined occupation possible condition, and transmits a securement signal to the on-board device; a first switching instruction step in which the on-board device transmits a switching instruction signal to a switch control device for a switch on the traveling scheduled route when receiving the securement signal; a switching step in which the switch control device carries out the switch and lock operation to transmits a switching completion signal to the on-board device when receiving the switching instruction signal; a traveling permission step in which the on-board device permits the traveling to the traveling scheduled route when receiving the switching completion signal; a release request step in which the on-board device transmits a release request signal to request the occupation release of the closed section which the train has traveled; and an occupation release step in which the control device releases the occupation of a target closed section based on the release request signal.

CITATION LIST

[Patent Literature 1] JP 2012-96704A
[Patent Literature 2] JP 2012-131324A

SUMMARY OF THE INVENTION

Therefore, an object of the present invention is to provide a signaling system and a control method of a moving vehicle, in which a space for devices and so on can be reduced. Also, another object of the present invention is to provide a signaling system and a control method of a moving vehicle, in which an introduction cost can be reduced. Still another object of the present invention is to provide a signaling system and a control method of a moving vehicle, in which the treatment of the devices is easier. Another object of the present invention is to provide a signaling system and a control method of a moving vehicle, in which the time taken until a train leaves a station can be reduced.

A signaling system of the present invention includes a plurality of on-board devices, a plurality of station interface devices and a plurality of branches. The plurality of on-board devices are provided for a plurality of moving vehicles traveling on a track. The plurality of station interface devices are provided for a plurality of stations along the track. The plurality of branches are provided onto the track and controlled by the plurality of station interface devices. A second on-board device of a second moving vehicle of the plurality of moving vehicles which is on a traveling route of a first moving vehicle of the plurality of moving vehicles transmits different moving vehicle related data which indicates data of the second moving vehicle, to a first on-board device of the first moving vehicle. A first station interface device of the plurality of station interface devices which controls a branch on the traveling route, transmits station related data which indicates data of the branch on the traveling route, to the first on-board device. The first on-board device outputs a command of maintenance of a state of the branch on the traveling route or switching and maintenance of the branch state to the first station interface device, to secure the traveling route based on the different moving vehicle related data and the station related data. The first station interface maintains or switches and maintains the state of the branch on the traveling route to secure the traveling route. The first on-board device determines the traveling of the first moving vehicle on the secured traveling route based on the different moving vehicle related data.

In the above signaling system, the first on-board device inquires the different moving vehicle related data to the second on-board device to acquire the different moving vehicle related data, and inquires the station related data to the first station interface device to acquire the station related data.

In the above signaling system, the first on-board device checks whether the traveling route has been secured, based on the station related data and the different moving vehicle related data, and may output a command to the first station interface device when the traveling route has not been secured.

In the above signaling system, the different moving vehicle related data may include a traveling permission limit position data indicating a range where the moving vehicle succeeding to the second moving vehicle is permitted to travel. The first on-board device may determine the traveling of the first moving vehicle in the range where the traveling is permitted, based on the traveling permission limit position data.

The above signaling system may further include a radio LAN configured to connect the plurality of on-board devices and the plurality of station interface devices to be bi-directionally communicable. The first on-board device may acquire the different moving vehicle related data and the station related data through the radio LAN.

The present invention is related to a control method of a moving vehicle by using a signaling system. The signaling system includes a plurality of on-board devices provided for a plurality of moving vehicles which travel on a track; a plurality of station interface devices provided for a plurality of stations along the track; and a plurality of branches provided on the track and controlled by the plurality of station interface devices. The control method of the moving vehicle, includes transmitting different moving vehicle related data which indicates data of a second moving vehicle, to a first on-board device of a first moving vehicle from a second on-board device of the second moving vehicle which is on a traveling route of the first moving vehicle of the plurality of moving vehicles; transmitting station related data which indicates data of a branch on the traveling route, to the first on-board device from a first station interface device, which controls the branch on the traveling route, of the plurality of station interface devices; outputting a command for maintenance or switching and maintenance of a state of the branch on the traveling route to the first station interface device from the first on-board device, to secure the traveling route based on the different moving vehicle related data and the station related data; securing the traveling route by maintaining or switching and maintaining the state of the branch on the traveling route by the first station interface device; and determining the traveling of the moving vehicle on the secured traveling route by the first on-board device based on the different moving vehicle related data.

In the above control method of the moving vehicle, the securing the traveling route may include: inquiring the different moving vehicle related data to the second on-board device from the first on-board device to acquire the different moving vehicle related data; and inquiring the station related data to the first station interface device from the first on-board device to acquire the station related data.

In the above control method of the moving vehicle, the outputting the command may include: checking whether the traveling route has been secured, based on the station related data and the different moving vehicle related data by the first on-board device, and outputting the command to the first station interface device when the traveling route is not secured.

In the above control method of the moving vehicle, the different moving vehicle related data may include a traveling permission limit position data indicating a range where the moving vehicle succeeding to the second moving vehicle is permitted to travel. The determining the traveling may include: determining the traveling of the moving vehicle in the range where the traveling is permitted, based on the traveling permission limit position data by the first on-board device.

The above control method of the moving vehicle may further include: acquiring the different moving vehicle related data and the station related data through a wireless LAN by the first on-board device.

According to the present invention, a space for devices and so on can be reduced. Also, according to the present invention, the reduction of the introduction cost becomes possible. Moreover, according to the present invention, the treatment of the devices becomes easy. Moreover, according to the present invention, the reduction of the time taken when the train leaves a station becomes possible.

BRIEF DESCRIPTION OF THE DRAWINGS

The object and other objects, advantages and features of the present invention could be understood in detail from the description of the following embodiments (examples), with reference to the drawings.

FIG. 6 is a diagram schematically showing a configuration example of a railroad line to which the signaling system according to the first embodiment is applied.

DESCRIPTION OF EMBODIMENTS

Hereinafter, a signaling system according to embodiments of the present invention will be described with reference to the attached drawings.

In this signaling system, a protection function, which is achieved by a protection device (of an interlocking device, an ATP ground device, and a station control device) in the conventional signaling system, is provided in an on-board device of a moving vehicle (a train) in a different configuration. As a result, the on-board device judges traveling route securement autonomously and determines a traveling route (establishing a traveling route autonomously and permitting the traveling autonomously), and the train interval protection can be autonomously carried out. Thus, the reduction of a device load in a control center, the reduction of a device space, the reduction of an introduction cost, and the easy handling of devices are realized. Hereinafter, the respective embodiments will be described in detail.

First Embodiment

1. Configuration

The configuration of a signaling system according to a first embodiment of the present invention will be described.

Figure 2:
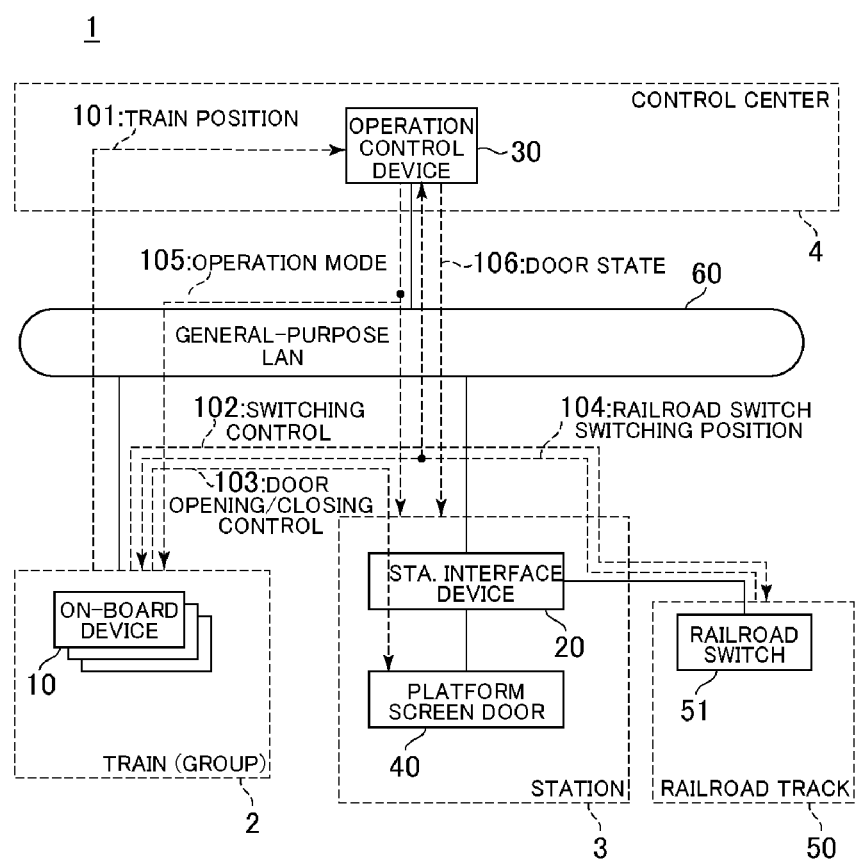
FIG. 2 is a block diagram showing a configuration of a signaling system according to a first embodiment.

FIG. 2 is a block diagram showing the configuration of the signaling system according to the present embodiment. The signaling system 1 is divided into divisions of a control center 4, trains (group) 2, stations 3, and railway tracks 50.

Figure 1:
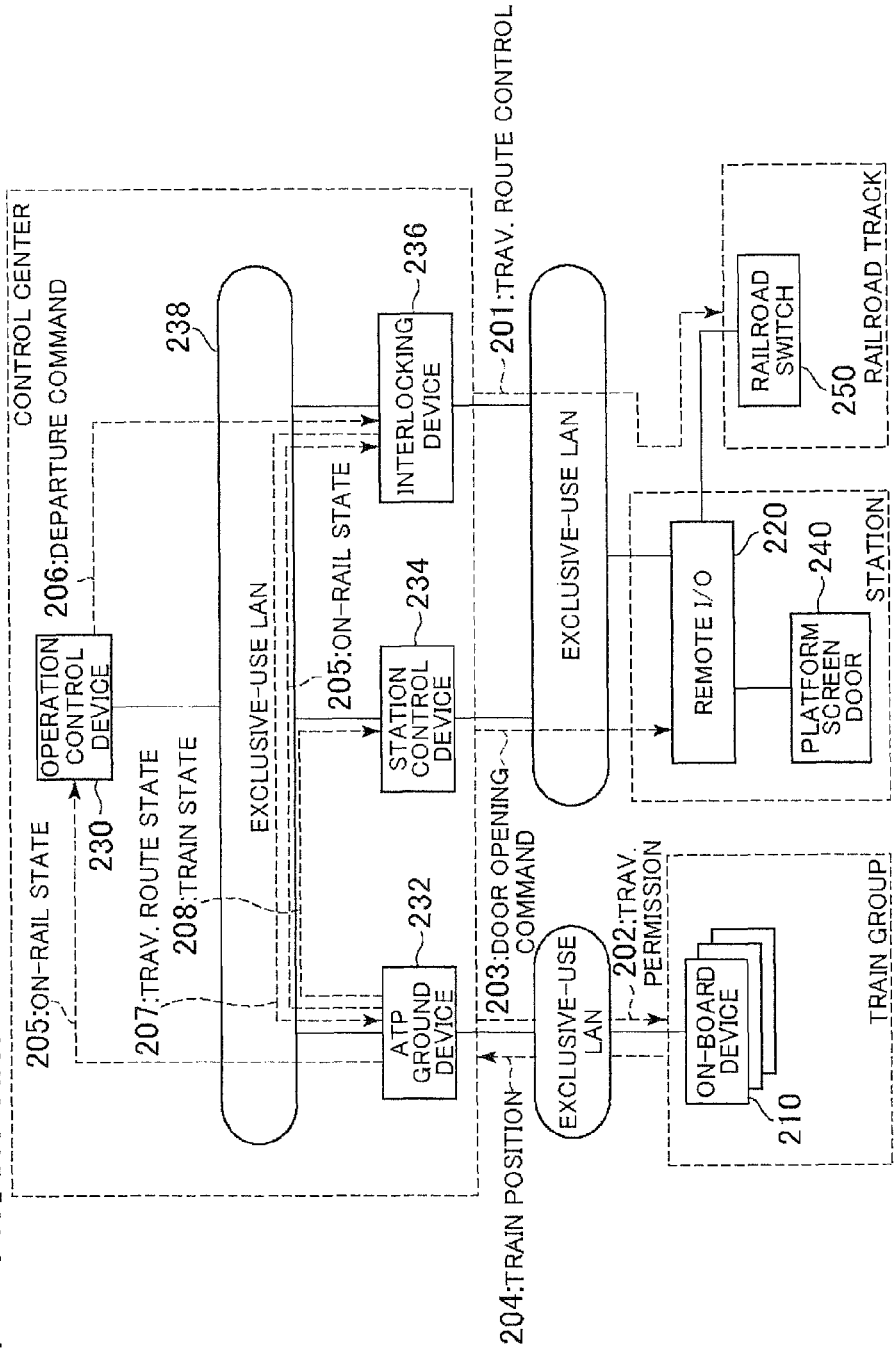
FIG. 1 is a block diagram showing a configuration of a conventional signaling system.

The control center 4 grasps an operation state of the trains 2 in the whole of railroad divisions. The control center 4 is provided with an operation control device 30. The operation control device 30 is connected with (on-board devices 10 of) the trains 2 and (station interface devices 20 of) the stations 3 through a general-purpose LAN 60 to be communicable bi-directionally. The operation control device 30 receives data of the trains 2 (e.g. train positions 101) from the trains 2, receives data of platform screen door, train door and railroad switches (e.g. door states 106, and railroad switch switching positions 104) from the stations 3, and displays them on a display unit (not shown). Also, the operation control device 30 sets an operation mode 105 and a train diagram of the train 2, and transmits them to the trains 2 and the stations 3. The operation mode 105 is exemplified by a normal mode in which a usual operation is carried out, and a failure mode in which a failure has occurred on a track. Any devices which have functions of the operation control device 230, the ATP ground device 232, the station control device 234, and the interlocking device 236, which are shown in FIG. 1, are not arranged in the control center 4.

There are a plurality of trains 2. Each train 2 grasps an operation state of each of neighbor trains 2, manages its own operation, and realizes a function safety. The train 2 is provided with the on-board device 10. The on-board device 10 is connected with (a station I/F device 20 of) each of the stations 3 through the general-purpose LAN 60 to be communicable bi-directionally. The on-board device 10 checks a railroad switch switching position 104 indicating a switching position of each of railroad switches through the station 3, and controls the protection of a traveling route of the train 2 by carrying out a switching control 102 to switch the railroad switch according to necessity. Moreover, the on-board device 10 controls the collision prevention with a preceding train or a succeeding train by communicating with the preceding and succeeding trains 2. Moreover, the on-board device 10 carries out a door opening/closing control 103 to open or close the train door and the platform screen door in the station 3, to attain a function safety of the train door and the platform screen door. In this way, the on-board device 10 is provided with the protection function that has been attained by the protection device (of the interlocking device, the ATP ground device, and the station control device) in the conventional signaling system, in a different form. Therefore, the interlocking device, the ATP ground device, and the station control device can be removed from the devices of the control center 4.

There are a plurality of stations 3. Each of the stations 3 carries out the opening/closing of the platform screen door 40 and the switching of the railroad switches 51 on the railroad track 50. The station 3 is provided with the station I/F device (station interface device) 20. The station I/F device 20 controls the opening/closing of the platform screen door 40 based on the control of the on-board device 10. Moreover, the station I/F device 20 controls the switching of the plurality of railroad switches 51 on the railroad track 50 on the inbound side and the outbound side in the neighborhood of the station 3 based on the control of the on-board device 10. Moreover, the station I/F device 20 manages a switching request to the railroad switches 51 from each train 2. When the requests compete, the station I/F device 20 does not accept the later switching request.

Figure 3:
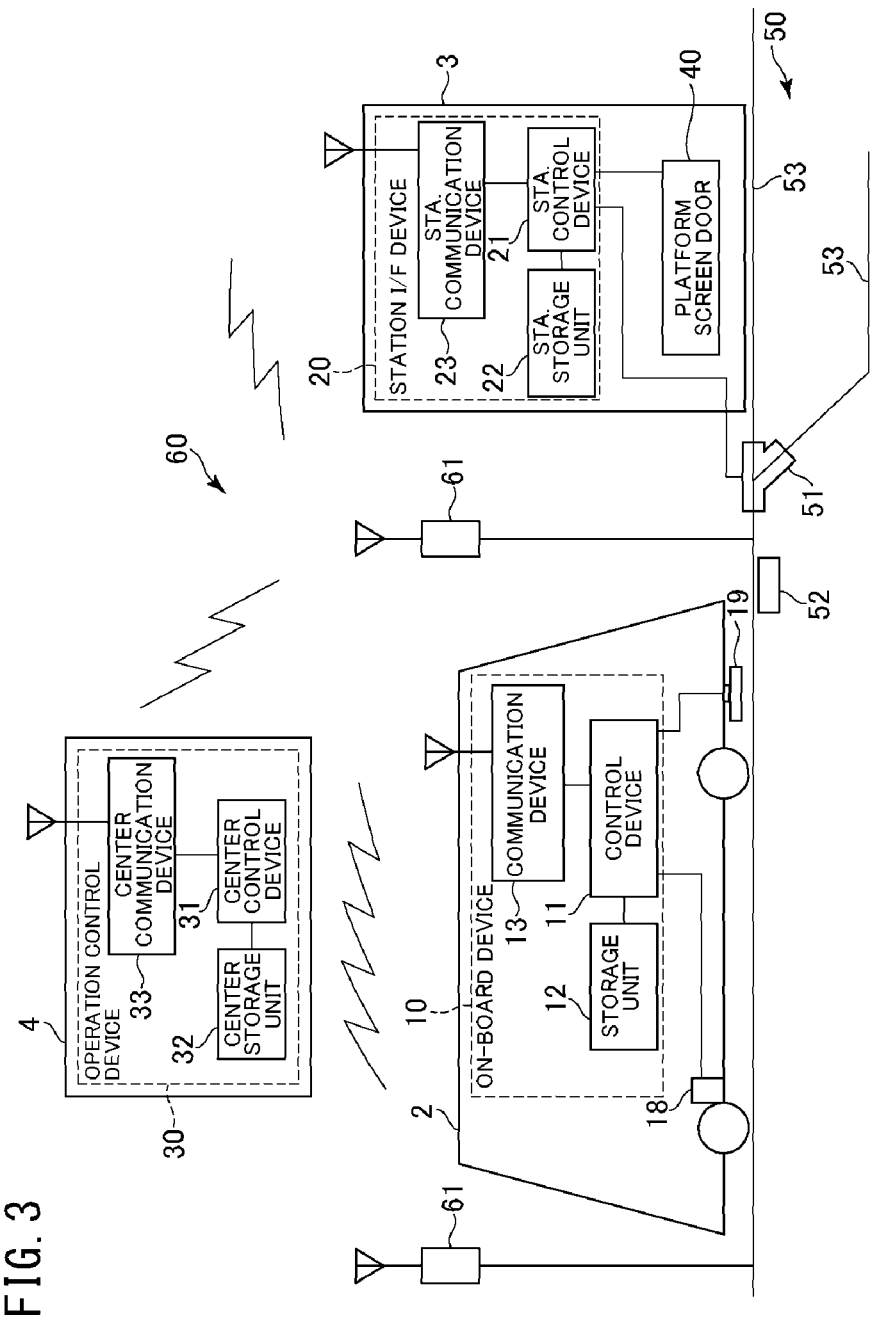
FIG. 3 is a block diagram showing a configuration example of the signaling system according to the first embodiment.

FIG. 3 is a block diagram showing a configuration example of the signaling system according to the present embodiment. The operation control device 30 of the control center 4 is provided with a center control device 31, a center storage unit 32 and a center communication device 33. The center control device 31 is an information processing device which is exemplified by a computer, and is provided with a CPU (Central Processing Unit), a storage section, an input section, an output section and an interface, which are not shown. The center control device 31 executes information processing for the operation control device 30. The center storage unit 32 is a storage unit which is exemplified by a hard disk drive, RAM (Random Access Memory) and ROM (Read Only Memory), and stores data and a software program which are used in the center control device 31, and data and a software program which are outputted from the center control device 31. The center communication device 33 is a radio LAN transmitting and receiving unit which carries out a data communication through the general-purpose LAN 60. The center communication device 33 transmits data and the software program which are outputted from the center control device 31, to the on-board device 10 and the station I/F device 20, and receives data and the software program which are transmitted from the on-board device 10 and the station I/F device 20 to output to the center control device 31.

The general-purpose LAN 60 is provided with a plurality of base stations 61. The plurality of base stations 61 are arranged in the control center 4 and each station 3 and at a plurality of locations along the railroad track 50. The base station 61 mediates a radio communication among the operation control device 30, the plurality of the on-board devices 10 and the plurality of the station I/F devices 20 to allow data to be sent and received among them. Note that in the present embodiment, an example using the radio LAN as the communication means is shown. However, different communication means may be used if it is possible to send and receive data among them.

The on-board device 10 of the train 2 is provided with a control device 11, a storage unit 12 and a communication device 13. The control device 11 is an information processing device which is exemplified by a computer, and is provided with a CPU, a storage section, an input section, an output section and an interface, which are not shown. The control device 11 executes information processing for the on-board device 10. The storage unit 12 is a storage which is exemplified by a hard disk drive, RAM and ROM, and stores data and a software program which are used in the control device 11, and data and a software program which are outputted from the control device 11. The communication device 13 is a radio LAN transmitting and receiving unit which carries out a data communication through the general-purpose LAN 60. The communication device 13 transmits the data and the software program which are outputted from the control device 11, to the on-board device 10 of the operation control device 30, and another train 2, the station I/F device 20, and receives the data and the software program which are transmitted from the on-board device 10 of the operation control device 30, the other train 2 and the station I/F device 20 to output to the control device 11.

Moreover, the train 2 is provided with a rotation count sensor 18 and a receiver 19. The rotation count sensor 18 detects the number of rotations of a wheel and a time change of them to output to the control device 11. The control device 11 calculates a position and speed of the train 2 based on the number of rotations and the time change of it. However, because the calculation of the position is carried out by integrating the number of rotations of the wheel, there is a possibility that an error comes out to an extent in case of a long-range integration due to the influences such as slip and tire abrasion. Therefore, a track antenna beacon (a transponder) 52 is installed in the railroad track 50 at a predetermined interval and the position is corrected every time the data of the track antenna beacon 52 is received, to prevent the accumulation of the error.

The station I/F device 20 of the station 3 is provided with a station control device 21, a station storage unit 22 and a station communication device 23. The station control device 21 is an information processing unit which is exemplified by a computer, and is provided with a CPU, a storage section, an input section, an output section and an interface, which are not shown. The station I/F device 20 executes information processing for the station I/F device 20. The station storage unit 22 is a storage unit which is exemplified by a hard disk drive, RAM and ROM, and stores data and a software program which are used in the station control device 21, and data and a software program which are outputted from the station control device 21. The station communication device 23 is a radio LAN transmitting and receiving unit which carries out a data communication through the general-purpose LAN 60, transmits the data and the software program which are outputted from the station control device 21, to the operation control device 30, the on-board device 10 and the station I/F device 20 of the other station 3, and receives the data and the software program, which are transmitted from the operation control device 30, the on-board device 10 and the station I/F device 20 of the other station 3, to output to the station control device 21.

Moreover, the station 3 is provided with the platform screen door 40. The station control device 21 detects a state of the platform screen door 40 and controls the opening/closing of the platform screen door 40. Moreover, the station control device 21 is connected with the plurality of railroad switches 51 (a plurality of branches) on the railroad track 50, which are arranged in the neighborhood of the station 3. The railroad switch 51 is a branch of the railroad track 53. The station control device 21 detects the state of each of the plurality of railroad switches 51 and controls the switching of each of the plurality of railroad switches 51.

Next, the control device of the on-board device 10 will be more described.

Figure 4A:
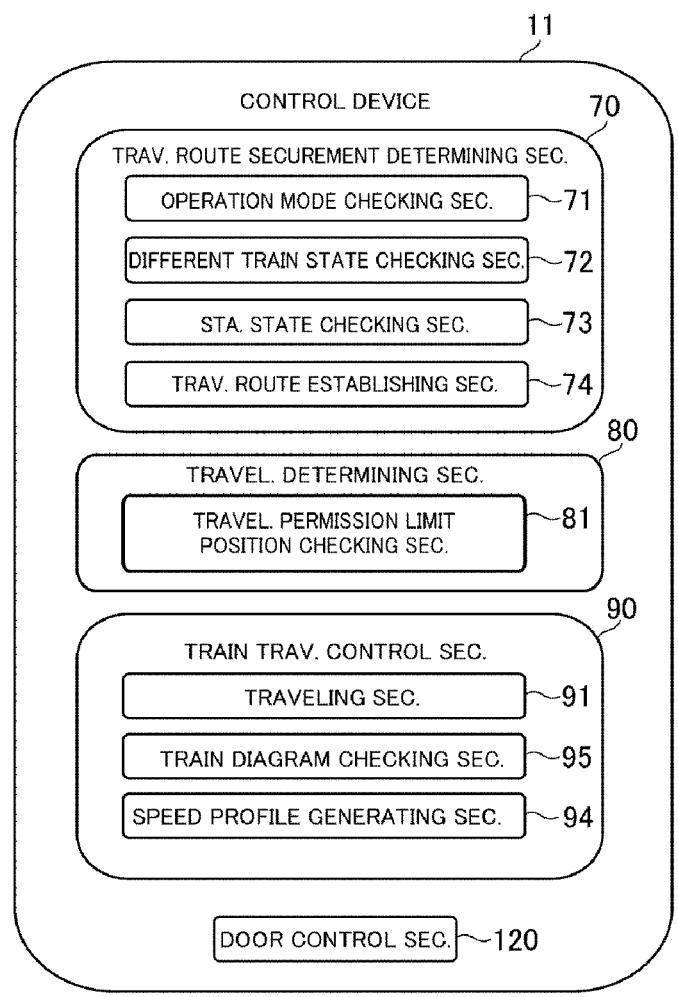
FIG. 4A is a block diagram showing a configuration example of a control device of an on-board device in the signaling system according to the first embodiment.

FIG. 4A is a block diagram showing a configuration example of the control device of the signaling system according to the present embodiment. In the control device, for example, the CPU develops a computer program installed in the hard disk drive through an interface from a recording medium, in RAM (Random Access Memory). Then, the CPU executes the developed computer program, and realizes information processing of the computer program while controlling a hardware configuration such as the storage section, the input section, the output section, the interface, the storage unit 12 and the communication device 13 according to necessity. The storage section and the storage unit 12 record the computer program and record the data used by the CPU and the generated data. The input section outputs the data generated through operation by the user and another device to the CPU and the storage section. The output section outputs the data generated by the CPU and the data stored in the storage section to the user and the other apparatus to be recognizable.

The control device 11 grasps the operation states of neighbor trains 2, manages its own operation and carries out a control for realizing a function safety. The control device 11 is provided with a traveling route securement determining section 70, a traveling determining section 80, a train traveling control section 90 and a door control section 120. The traveling route securement determining section 70, the traveling determining section 80, the train traveling control section 90 and the door control section 120 are realized by the computer program, or by cooperation between the computer program and the hardware configuration.

The traveling route securement determining section 70 carries out a control for the protection of a traveling route of the train 2 itself. That is, the traveling route securement determining section 70 checks the securement of the traveling route based on station related data (to be described later) and different train related data (to be described later). Specifically, the traveling route securement determining section 70 checks the railroad switch switching position showing the switching position of the railroad switch 51 through the station 3, and carries out the switching control to switch the railroad switch 51 according to necessity. The traveling route securement determining section 70 is provided with an operation mode checking section 71, a different train state checking section 72, a station state checking section 73 and a traveling route establishing section 74. The operation mode checking section 71 checks the operation mode. The different train state checking section 72 acquires the different train related data and checks the state of a different train 2. The station state checking section 73 acquires the station related data and checks the state of the station (e.g. the switching position of the railroad switch 51 (a branch state)). The traveling route establishing section 74 switches the switching position of the railroad switch 51 according to necessity and establishes (secures) the traveling route for the train 2.

The traveling determining section 80 carries out a control for the collision prevention among the trains 2. That is, the traveling determining section 80 determines the traveling of the moving vehicle on the traveling route which was secured based on the different moving vehicle related data. Specifically, the traveling determining section 80 communicates with the neighbor train 2 and grasps a range where the train 2 itself is permitted to pass or travel, and permits the passage of the train 2 in the range (determines the traveling of the train 2 itself). The traveling determining section 80 is provided with a traveling permission limit position checking section 81. The traveling permission limit position checking section 81 checks a traveling permission limit position of the train 2. Here, the traveling permission limit position shows a limit position where the traveling (moving) is permitted to the targeted train 2 (e.g. distance from a reference point, or distance to a preceding train).

The train traveling control section 90 carries out a control for the train 2 to move (travel) based on a train diagram of the train 2, a position of the train 2, and the traveling permission limitation position. The train traveling control section 90 is provided with a traveling section 91, a speed profile generating section 94 and a train diagram checking section 95. The traveling section 91 drives the train 2 to travel. The train diagram checking section 95 checks the train diagram of the train 2 and issues a departure command at a departure time. The speed profile generating section 94 generates a speed limit profile showing an upper limit value of speed when traveling from a current station at which the train 2 is in a stop state to a next stop station, based on a distance from the targeted train 2 to the traveling permission limitation position.

The door control section 120 carries out a control for the function safety of the doors of the train 2 and the platform screen door by controlling the opening/closing of the doors of the train 2 and the platform screen door 40 in the station 3.

Next, the station control device 21 of the station I/F device 20 will be more described.

Figure 4B:
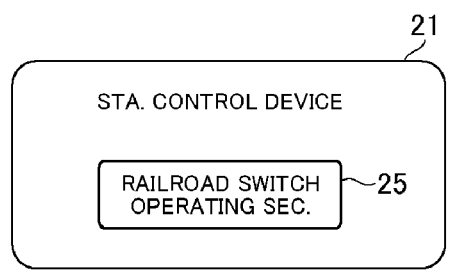
FIG. 4B is a block diagram showing a configuration example of the control device of a station I/F device in the signaling system according to the first embodiment.

FIG. 4B is a block diagram showing a configuration example of the station control device 21 of the signaling system according to the present embodiment. In the station control device 21, for example, the CPU develops the computer program installed in the hard disk drive through an interface from a storage medium, in the RAM. Then, the CPU execute the developed computer program, and realizes information processing of the computer program while controlling a hardware configuration such as a storage section, an input section, an output section, an interface, the station storage unit 22, and the station communication device 23 according to necessity. The storage section and the storage unit 12 record the computer program and record data used by the CPU and the generated data. The input section outputs the data generated through the operation by the user and the other device to the CPU and the storage section. The output section outputs the data generated by the CPU and the data of the storage section to the user and the other devices to be recognizable.

The station control device 21 controls the opening/closing of the platform screen door 40 and the switching of the railroad switch 51 of the railroad track 50. The station control device 21 is provided with a railroad switch operating section 25. The railroad switch operating section 25 is realized by the computer program or the cooperation between the computer program and the hardware configuration.

The railroad switch operating section 25 outputs the railroad switch switching position data showing a switching position of the railroad switch 51 in response to an inquiry of the station related data from the train 2. Also, the railroad switch operating section 25 determines whether the switching of the railroad switch 51 is possible or not, based on a railroad switch switching command from the train. When the railroad switch 51 has been locked in response to the railroad switch switching command from a different train 2, the railroad switch operating section 25 refuses the switching of the railroad switch 51. When the railroad switch 51 has not been locked, the railroad switch operating section 25 carries out the switching of the railroad switch 51 and retains the railroad switch switching command as a part of the railroad switch switching position data (stores in the station storage unit 22). While the railroad switch switching command is retained, the switching state of the railroad switch 51 is maintained (locked). In this case, the railroad switch operating section 25 erases the railroad switch switching command based on a railroad switch release command from a source side train 2. Thus, the lock state of the railroad switch 51 is released. The station control device 21 of the station I/F device 20 grasps whether or not there is a failure on the traveling route to the other station 3 which is neighbor to the station 3, based on an input from a user and a notice from the station I/F device 20 of the other station 3.

Next, the main data which are stored in the storage unit 12, the station storage unit 22 and the center storage unit 32 will be described.

Figure 5A:
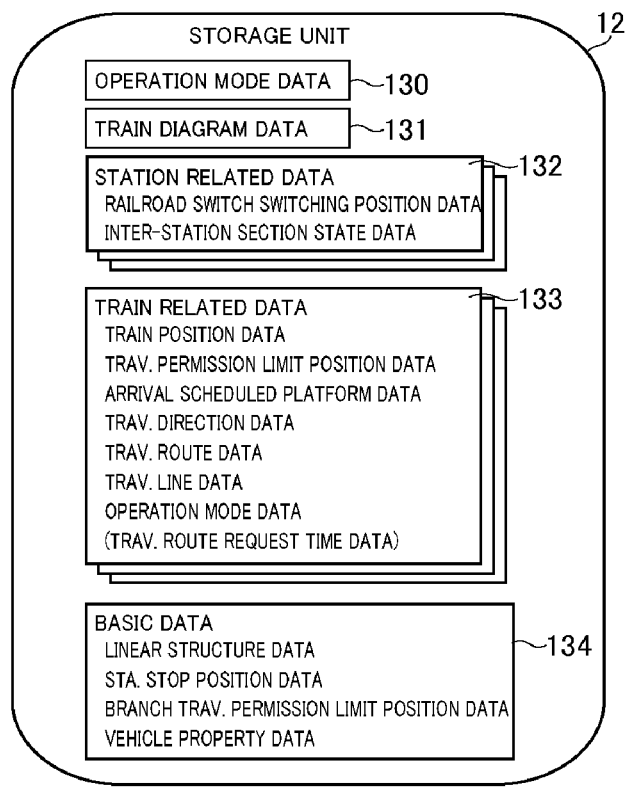
FIG. 5A is a block diagram showing a configuration of a storage unit of the on-board device in the signaling system according to the first embodiment.

FIG. 5A is a block diagram showing the configuration of the storage unit 12 of the on-board device 10 of the signaling system according to the present embodiment. The storage unit 12 contains operation mode data 130, train diagram data 131, station related data 132, train related data 133 and basic data 134 at least.

The operation mode data 130 contains data showing in what mode the train 2 travels. The operation mode data 130 is exemplified by the normal mode showing a usual operation and the failure mode showing a case where a failure has occurred on the track (it is the same as the operation mode 105 of FIG. 2). The operation mode data 130 is supplied from the operation control device 30 and is same for all the trains 2 on a railroad line.

The train diagram data 131 contains data showing the train diagram of the train 2. The train diagram data 131 is supplied from the operation control device 30 and is different for every train 2. However, the train diagram data 131 may contain only the train diagram of the train 2 and the neighbor train 2. Or, the train diagram data may be data of an operation interval.

When the train 2 is in a stop state, the station related data 132 contains data related to a current station (hereinafter, to be referred to as the station 3A) at which the train 2 is in the stop state, data related to the next station as the station 3 (hereinafter, to be referred to as the station 3B) for the train to be stopped next, data related to a previous station as the station 3 (hereinafter, to be referred to as the station 3C) for the train to have been stopped last time. When the train 2 is traveling, the station related data 132 contains data related to the previous station as the station 3 for the train 2 to have departed and data related to the next station as the station 3. The station related data 132 is updated appropriately (e.g. regularly) and is different for every train 2. The station related data 132 contains the railroad switch switching position data and the inter-station section state data. The railroad switch switching position data shows a switching position of each of the plurality of railroad switches 51 which belongs to the targeted stations 3A, 3B and 3C (the previous station, the current station, the next station), and contains the railroad switch command data (to be described later) of each railroad switch 51. Moreover, the railroad switch switching position data may contain the locked state or the unlocked state of the railroad switch 51. The inter-station section state data shows whether or not there is a failure in an inter-station section (e.g. between the station 3A and the station 3B, between the station 3A and the station 3C) among the targeted stations 3A, 3B and 3C, and whether or not a different train is not in the on-rail state between the stations (the on-rail clearance between the stations).

The train related data 133 contains data showing the moving (traveling) of the train 2 (hereinafter, to be referred to as the train 2A) and a different train 2 (hereinafter, to be referred to as the train 2B) around the train 2A and related to the traveling. The train related data 133 is updated appropriately (e.g. regularly) and is different for every train 2. The train related data 133 contains train position data, traveling permission limit position data, arrival scheduled platform data, traveling direction data, traveling route data and traveling line data. The train position data shows a position (e.g. a distance from a reference point) of each of targeted trains 2 (the train 2A and the train 2B). The reference point is exemplified by a stop position in a starting station and a position of a track antenna beacon provided on the railroad track. The traveling permission limit position data shows a limit position for the targeted train 2 to be permitted to travel (move) (e.g. a distance from the reference point, a distance to a preceding train). The arrival scheduled platform data shows an arrival scheduled platform of the next station for the targeted train 2. The traveling direction data shows a traveling direction of the targeted train 2 (e.g. an inbound direction, an outbound direction, a branch direction). The traveling route data shows a traveling route of the targeted train 2. The traveling line data shows the traveling line (inbound line, outbound line) of the targeted train 2. Note that the arrival scheduled platform data, the traveling direction data, the traveling route data and the traveling line data can be called travel schedule data showing a schedule of travel of the train 2. Moreover, the train related data 133 may further contain the operation mode data and traveling route request time data. The operation mode data shows the operation mode of the targeted train 2. The traveling route request time data shows a time at which the targeted train 2 issues a traveling route request (switching request of the railroad switch 51) to the station I/F device 20.

The basic data 134 contains data of a basic configuration of the trains 2, the railroad tracks 50 and so on. The train 2 on the railroad line retains common basic data 134. Here, because the vehicle characteristic is sometimes different for every vehicle, each train 2 retains vehicle characteristic data showing the vehicle characteristic of its own vehicle. The basic data 134 contains linear structure data, station stop position data, limit position data in case of a failure (for branch), and vehicle characteristic data. The linear structure data shows the structure of the railroad track 50, and is exemplified by a position, shape and distance of a curved railroad track, a position and distance of a linear railroad track, a grade of the railroad track, a position of a station, a branch position, existence or non-existence of double track, a position of the rail yard and so on. The station stop position data shows a stop position at every station. The branch limit position data shows a traveling limit position on a branch railroad track of the railroad track 50. The vehicle characteristic data shows structure characteristic and operation characteristic of the vehicle.

Figure 5B:
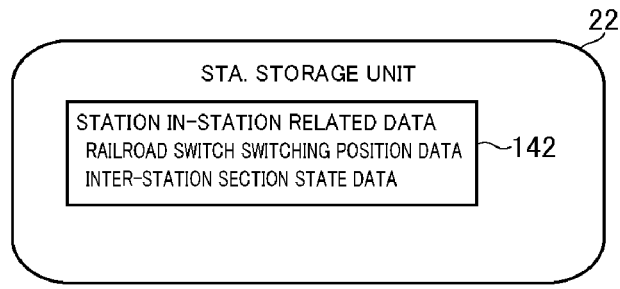
FIG. 5B is a block diagram showing a configuration of the storage unit of the station I/F device in the signaling system according to the first embodiment.

FIG. 5B is a block diagram showing the configuration of the station I/F device 20 of the signaling system according to the present embodiment. The station storage unit 22 contains station in-station related data 142 at least.

The station in-station related data 142 contains data related to the station 3. The station in-station related data 142 is different for every station 3. The station in-station related data 142 contains railroad switch switching position data and inter-station section state data. The railroad switch switching position data shows a switching position of each of a plurality of railroad switches 51 which belong to the station 3, and contains railroad switch command data of each railroad switch 51. The railroad switch command data shows the railroad switch switching command from the train 2 to each of the plurality of railroad switches 51 which belong to the station 3. The railroad switch switching command is a command which instructs the switching of the railroad switch 51, and is related with data of a command source side train 2 and is stored. While the railroad switch switching command is retained, the railroad switch 51 maintains (locks) the switching state. When the railroad switch switching command is erased in response to a railroad switch release command from the command source side train 2, the lock state of the railroad switch 51 is released. The inter-station section state data shows whether or not there is a failure between the station 3 and a neighbor station 3. The railroad switch command data and the inter-station section state data are transmitted to the on-board device 10 and the operation control device 30, and are stored as the station related data 132 and the center station related data 152.

Figure 5C:
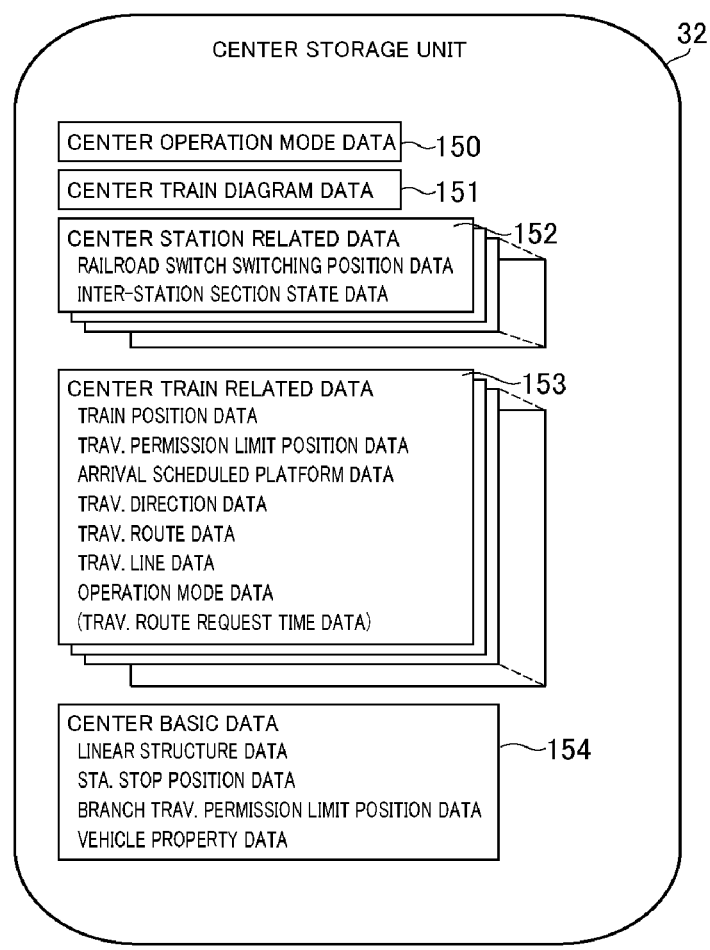
FIG. 5C is a block diagram showing a configuration of the storage unit of an operation control device in the signaling system according to the first embodiment.

FIG. 5C is a block diagram showing the configuration of the center (CTR.) storage unit 32 of the operation control device 30 of the signaling system according to the present embodiment. The center storage unit 32 contains center (CTR.) operation mode data 150, center (CTR.) train diagram data 151, center (CTR.) station related data 152, center (CTR.) train related data 153 and center (CTR.) basic data 154 at least.

The center operation mode data 150 is the same as the operation mode data 130.

The center train diagram data 151 contains data showing a train diagram of a railroad line and contains the train diagrams for all the trains 2. The train diagram data may be data of the operation interval.

The center station related data 152 contains data related to all stations 3. The center station related data 152 contains the railroad switch switching position data and inter-station section state data of the station in-station related data 142 acquired from all the stations 3. The center station related data 152 are appropriately acquired from the station I/F devices 20 of all the stations 3.

The center train related data 153 contains data related to the moving (traveling) of all the trains 2. The center train related data 153 contains the train position data, the traveling permission limit position data, the arrival scheduled platform data, traveling direction data, the traveling route data and the traveling line data of the train related data 133 acquired from all the trains 2. The center train related data 153 are appropriately acquired from the on-board devices 10 of all the trains 2.

The center basic data 154 contains data of basic structures of the train 2, the railroad track 50 and so on. The center basic data 154 is the same as the basic data 134.

2. Operation

Next, the operation of the signaling system according to the present embodiment will be described. In this case, as the operation of the signaling system, a train interval protection in case of traveling of the train 2 between the stations in the usual operation (the normal mode) will be described.

A configuration example of a railroad line to which the signaling system is applied will be described before the explanation of a specific operation.

FIG. 6 is a schematic diagram showing a configuration example of the railroad line to which the signaling system to according the present embodiment is applied. This railroad line is provided with a railroad track 50 and stations 3. The railroad track 50 is provided with a railroad track 53D, a railroad track 53U and crossovers 53M. The railroad track 53D is a railroad track of an outbound line provided between line ends 161. The railroad track 53U is a railroad track of an inbound line provided between tracks ends 161. The crossover 53M is a railroad track provided in the neighborhood of the station 3 to join the railroad track 53D and the railroad track 53U. A plurality of stations 3 are provided between the railroad track 53D and the railroad track 53U to have intervals. In this railroad line, an area of the station 3 which contains the tracks ends 161 is referred to as an end station portion 160 and an area of the station other than the end station portions 160 is referred to as an intermediate state portion 170. In the signaling system, in the intermediate station portion 170 of this traveling route, the traveling directions of the trains 2 in the inbound line 53U and the outbound line 53D are regarded to be fixed in the usual operation. Below, the operation of the signaling system in such a railroad line will be described.

Next, a scene of the train interval protection in the configuration example of the railroad line of FIG. 6 will be described.

Figure 7:
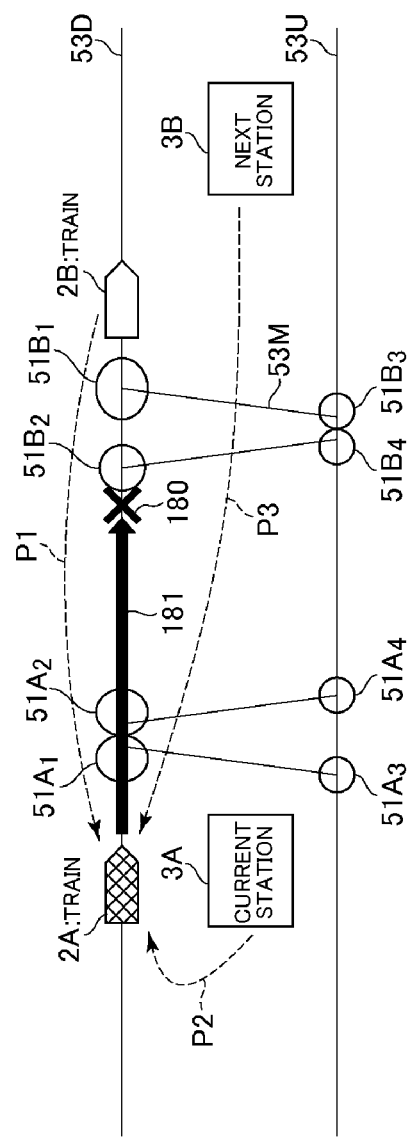
FIG. 7 is a diagram schematically showing a scene of a train interval protection in case of inter-station traveling of a train in a station intermediate section.

FIG. 7 is a diagram schematically showing the scene of the train interval protection in an inter-station traveling of the train in the intermediate station portion 170. In FIG. 7, the attention should be paid to the train 2A which travels between the stations in the intermediate station portion 170. It is supposed that the train 2A travels on the railroad track 53D of the outbound line. The station 3 at which the train 2A has been currently stopped is supposed to be a current station 3A, the station at which the train 2 stops next is supposed to be a next station 3B, the train 2 preceding to the train 2A is supposed to be a train 2B. The railroad switches 51 provided at the current station 3A are supposed to be the railroad switches 51A1 and 51A2 on the side of the railroad track 53D from the side near the station 3A, and are supposed to be the railroad switches 51A3 and 51A4 on the side of the railroad track 53U. The railroad switches 51 provided at the next station 3B are supposed to be the railroad switches 51B1 and 51B2 on the side of the railroad track 53D from the side near the station 3B and are supposed to be the railroad switches 51B3 and 51B4 on the side of the railroad track 53U.

As mentioned above, in case of the usual operation, the traveling directions of the trains 2 in the inbound line 53U and the outbound line 53D are fixed in the intermediate station portion 170. That is, the station I/F device 20 of each station 3 maintains the traveling rout between the stations 3 to constant directions, and maintains the railroad switch switching positions of the railroad switches 51 in predetermined directions. The direction of the traveling route is expressed as the operation mode. In this case, it is the normal mode. The operation control device 30 notifies the operation mode to each train 2 through each station I/F device 20. The operation mode is never changed in principle if there is not the occurrence of a predetermined situation such as a failure. That is, it is presupposed that the train 2 travels on a single line (the railroad track 53D or the railroad track 53U) in the intermediate station portion 170 in the normal mode and does not cross on the railroad tracks 53 to the opposite side by using the crossover 53M. In other words, the inbound line (the railroad track 53U) and the outbound line (the railroad track 53D) are independent from each other. Therefore, in case of the normal mode, it is enough to consider only the train interval protection to the preceding train 2 on the single line in the intermediate station portion 170, for the train interval protection of the train 2. Here, the train 2 checks the passage direction of the railroad switch 51 and the inter-station section state, before traveling between the stations.

Note that when it is necessary to cross to another railroad track as in the end station portion 160 (e.g. the time of folding or switching the mode), the traveling route control becomes necessary. That is, a different data communication route is necessary in addition to the intervals to the preceding train 2 and the succeeding train 2. Such a case will be described in a second embodiment.

Next, a method of exchanging data between the on-board device 10 of the train 2 and a different device will be described.

Figure 8:
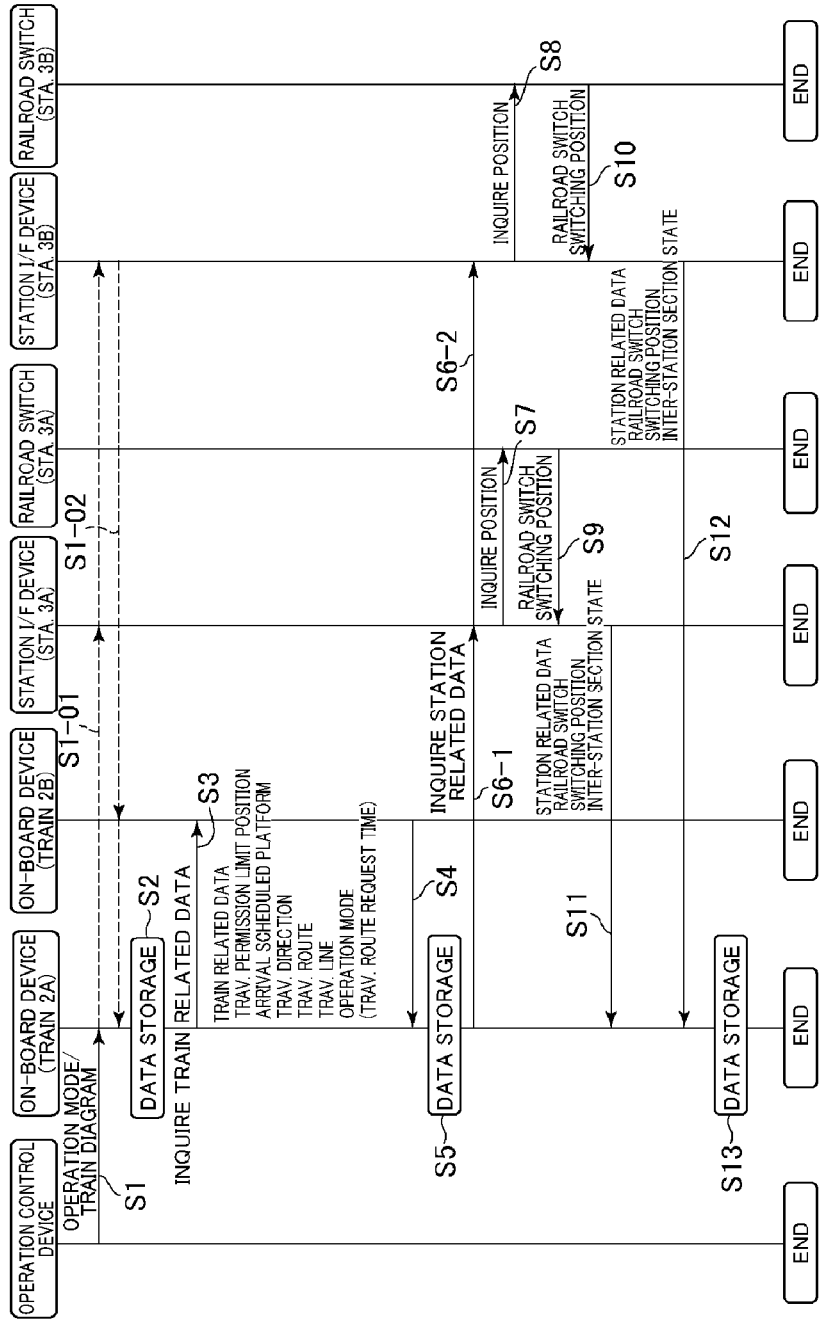
FIG. 8 is a flow chart showing an operation when the on-board device of the train communicates with other device.

FIG. 8 is a flow chart showing the operation when the on-board device of the train and the different device exchange data. The on-board device 10 of the train 2 exchange data with the different device (a plurality of different on-board devices 10, a plurality of station I/F devices 20, and the operation control device 30) according to necessity, or regularly. In this case, the attention should be paid to the on-board device 10 of the train 2A in FIG. 7.

The operation control device 30 transmits the operation mode (the normal mode) and the train diagram to the on-board device 10 of the train 2A at, for example, the departure time of the train 2A (Step S1). In this case, these data may be transmitted to the on-board device 10 of the train 2A through the station I/F device 20 (Steps S1-01/S1-02). The on-board device 10 of the train 2A stores these data in the storage unit 12 (Step S2).

The on-board device 10 (the different train state checking section 72) of the train 2A inquires the train related data to the on-board device 10 of the different train 2B (Step S3). The on-board device 10 of the train 2B transmits the train related data of the train 2B to the on-board device 10 of the train 2A in response to the inquiry (Step S4). The on-board device 10 (the different train state checking section 72) of the train 2A stores the data in the storage unit 12 (Step S5). The train related data contains the traveling permission limit position data, the arrival scheduled platform data, the traveling direction data, the traveling route data, the traveling line data, and the operation mode data (the traveling route request time data, and the train position data). The different train 2 having received the inquiry is the preceding train 2B related to the train interval protection in this case. Here, in the operation mode in which entering of the train from the crossover 53M is predicted, the inquiry is issued to the trains 2 in a neighbor field (within a predetermined distance) containing the train on an opposite line in addition to the preceding train.

The on-board device 10 (the station state checking section 73) of the train 2A inquires the station related data to the station I/F devices 20 of the station 3A and the station 3B (Step S6-1/S6-2). The station I/F device 20 of the station 3A inquires the railroad switch switching positions to the railroad switches 51A1 to 51A4 in response to the inquiry (Step S7). The railroad switches 51A1 to 51A4 reply the railroad switch switching positions to the station I/F device 20 of the station 3A (Step S9). In the same way, the station I/F device 20 of the station 3B inquires the switching positions to the railroad switches 51B1 to 51B4 in response to the inquiry (Step S8). The railroad switches 51B1 to 51B4 reply the railroad switch switching positions to the station I/F device 20 of the station 3B (Step S10). The station I/F devices 20 of the station 3A and the station 3B transmit the station related data of the station 3A and the station 3B to the on-board device 10 of the train 2A (Steps S11/S12). The on-board device 10 (the station state checking section 73) of the train 2A stores the data in the storage unit 12 (Step S13). The station related data contains the railroad switch switching position data, and the inter-station section state data. The stations 3 as an inquiry destination are the current station 3A and the next station 3B related to the train interval protection in this case. Note that when the station I/F device 20 always grasps the railroad switch switching position data, the steps S7 to S10 can be omitted.

In this way, the train 2A inquires necessary data to the other devices (a plurality of different on-board devices 10, a plurality of station I/F devices 20, and an operation control device 30) regularly or according to necessity and acquires the data.

Next, the train interval protection in case of inter-station traveling of the train in the intermediate station section will be described specifically.

Figure 9A:
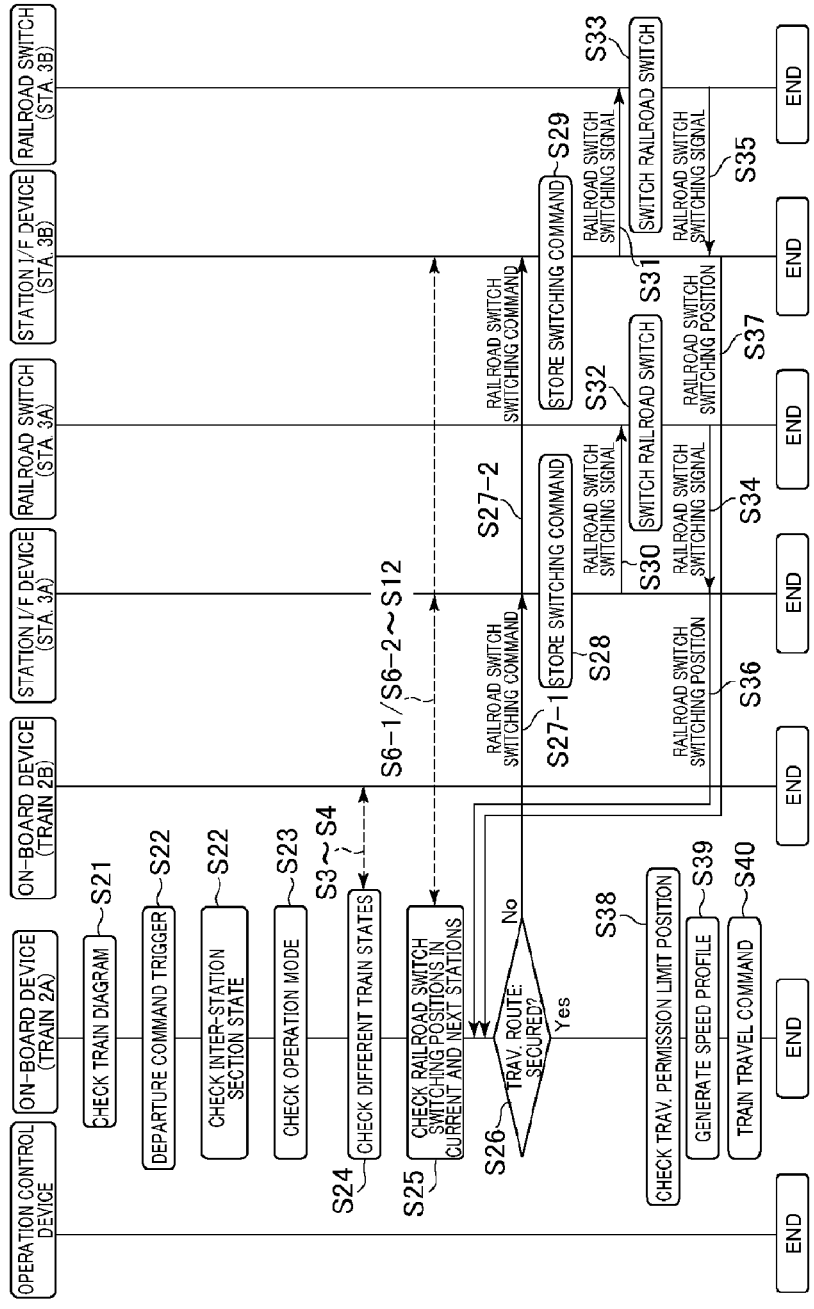
FIG. 9A is a flow chart showing an operation of the train interval protection in case of inter-station traveling of the train in the station intermediate section.

FIG. 9A is a flow chart showing the operation of the train interval protection in case of inter-station traveling of the train in the intermediate station section. The on-board device 10 of the train 2 carries out the traveling route securement and the traveling permission by the train 2 itself based on the exchange of data with the above-mentioned different device. In this case, the attention should be paid to the on-board device 10 of the train 2A in FIG. 7.

The on-board device 10 (the train diagram checking section 95) of the train 2A reads the train diagram from the storage unit 12 and checks the departure time (Step S21). Then, when the departure time comes, the on-board device 10 issues a departure command (Step S22).

Next, the on-board device 10 (the operation mode checking section 71) of the train 2A reads the operation mode from the storage unit 12 and confirms that the operation mode is the normal mode (Step S23). Thus, it is checked and confirmed that any failure has not occurred on the railroad track 50 and that the traveling route of the train 2A on the railroad track 53D of the outbound line is a traveling route which destines for the next station 3B on the railroad track 53D.

Next, the on-board device 10 (the different train state checking section 72) of the train 2A checks the state of a different train 2 (the train 2B) (Step S24). For example, this step can be executed like the steps S3 to S5 in FIG. 8. Thus, the on-board device 10 acquires the train related data P1 of the train 2B (the traveling permission limit position data, the arrival scheduled platform data, the traveling direction data, the traveling route data, the traveling line data, and the operation mode data). It is possible to check whether or not the train 2B is in the normal mode based on the operation mode data. The next destination of the train 2B (the station 3) can be checked based on the arrival scheduled platform data, the traveling direction data, the traveling route data, and the traveling line data. By the traveling permission limit position data, the distance 181 (position 180) to which the train 2A can travel can be confirmed. The train related data P1 can be acquired without passing through the control center 4.

Next, the on-board device 10 of the train 2A (the station state checking section 73) checks the states of the stations 3 (the station 3A and the station 3B) (Step S25). For example, this step can be executed like the steps S6-1/S6-2 to S13 in FIG. 8. Thus, the station related data P2 and P3 (the railroad switch switching position data, and the inter-station state data) are acquired. Whether there is a failure in the inter-station section and whether the on-rail train clearance between the stations has been achieved can be checked based on the inter-station section state data. Based on the railroad switch switching position data, it can be checked whether the switching positions of the railroad switches 51A1, 51A2, 51B2, 51B1 which are on the traveling route of the train 2A is secured. These station related data P2 and P3 can be acquired without passing through the control center 4.

Next, the on-board device 10 of the train 2A (the traveling route establishing section 74) checks the on-rail clearance between the stations and determines whether or not the traveling route of the train 2A has been secured, based on the railroad switch switching position data of the station related data P2 and P3 (Step S26). That is, it is determined whether the switching positions of the railroad switches 51A1, 51A2, 51B2, and 51B1 cause any problem in the traveling of the train 2A from the station 3A to the next station 3B. Specifically, whether or not the railroad switches 51 are secured and be locked is determined in response to the railroad switch switching command from the train 2A. When the traveling route has not been secured (Step S26: No), the traveling route establishing section 74 outputs the railroad switch switching command to the station I/F device 20 of the station 3 (the station 3A, the station 3B) to which the railroad switches 51 to be switched (51A1, 51A2, 51B2, and 51B1) belong (Steps S27-1/S27-2).

The station I/F device 20 (the railroad switch operating section 25) relates the railroad switch switching command with the train 2A and stores them in the station storage unit 22 (Steps S28/S29). Then, the railroad switch switching signal is outputted to the targeted railroad switches 51 (51A1, 51A2, 51B2, 51B1) (Steps S30/S31) in response to the railroad switch switching command. The targeted railroad switches 51 (51A1, 51A2, 51B2, and 51B1) are switched in response to the railroad switch switching signal (Steps S32/S33), and outputs a switching confirmation signal to the station I/F device 20 (Steps S34/S35). The station I/F device 20 (the railroad switch operating section 25) outputs the railroad switch switching positions to the on-board device 10 of the train 2A in response to the switching confirmation signal (Steps S36/S37). At this time, the railroad switch switching command is stored in the station storage unit 22 so that the railroad switches 51 are locked by the station I/F device 20 (the railroad switch operating section 25). For example, the railroad switch switching signal from the station I/F device 20 (the railroad switch operating section 25) is set to the high level, and the signal is continuously outputted. The locking state is continued until the train 2A passes away, the station I/F device 20 receives the railroad switch release command from the on-board device 10 of the train 2A and the station I/F device 20 erases the railroad switch switching signal. In this case, even if the railroad switch switching signal is erased, the switching position of the railroad switch 51 may be held without being moved just as it is, until the railroad switch switching command is received from the succeeding train to the train 2A.

The traveling route establishing section 74 of the on-board device 10 determines whether or not the traveling route of the train 2A has been secured in response to the railroad switch switching position (Step S26). When the traveling route has been secured (Step S26: Yes), the traveling route establishing section 74 advances toward step S38. Thus, the traveling route securement for the train 2A completes.

Note that the determination for the first time may be made as NO at step S26 so that the steps from S27 to S36 are executed, regardless of whether the traveling route has been secured (whether or not the switching positions of the railroad switches 51A1, 51A2, 51B2, 51B1 have any problem as for the traveling of the train 2A to the next station 3B). That is, the command (the railroad switch switching command) of the switching and the maintenance (locking) may be outputted to (the station I/F device 20 for) the railroad switch 51 on the traveling route at least once. Thus, the traveling route can be more surely secured.

Next, the on-board device 10 of the train 2A (the traveling permission limit position checking section 81) checks the traveling permission limit position. That is, a distance 181 (position 180) by which the train 2A can travel is checked (Step S38). In a range to the traveling permission limit position, the on-board device 10 of the train 2A issues the traveling permission. Regarding the permission of traveling, a permission range is set in the range between the train 2A and the train 2B (e.g. the distance to the traveling permission limit position). Therefore, it is not necessary to provide a conventional closed section and so on and the facilities can be simplified.

Next, the on-board device 10 (the speed profile generating section 94) of the train 2A, i.e. the speed profile generating section 94 generates a speed limit profile indicating an upper limit value of the speed when traveling from the current station 3A to the next station 3B, based on the traveling permission limit position, i.e. based on the distance from the targeted train 2 to the traveling permission limitation position (Step S39). After that, the on-board device 10 (the traveling section 91) of the train 2A starts traveling of the train 2A based on the basic data 134 (the linear structure, the vehicle characteristic and so on) stored in the storage unit 12, while referring to the speed limit profile, so that the train 2A travels to the next station 3B according to the train diagram (Step S40).

As mentioned above, the train interval protection in the inter-station travel of the train in the intermediate station section is carried out.

Here, the release of the locking state of a branch (the railroad switch 51) will be described.

Figure 9B:
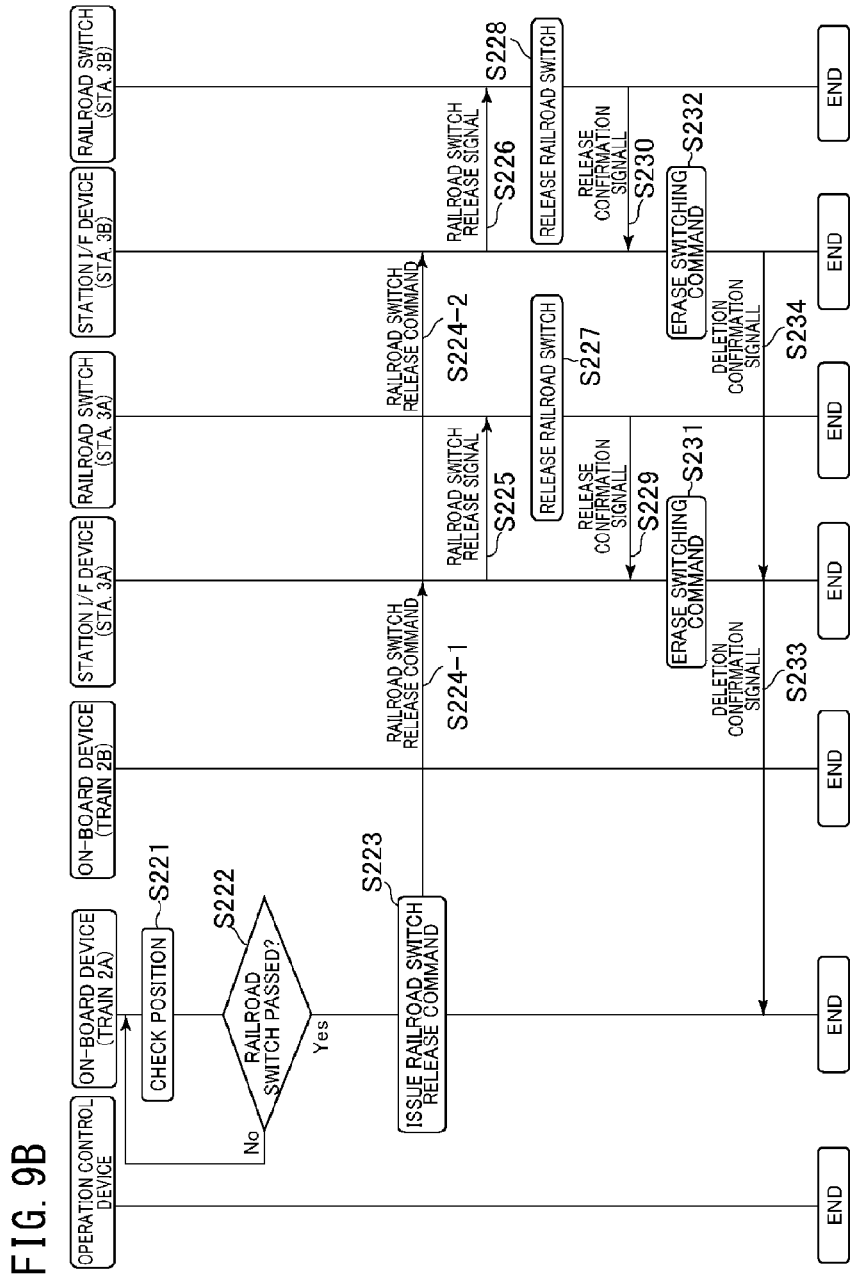
FIG. 9B is a flow chart showing an operation when the on-board device of the train carries out branch release of the station I/F device.

FIG. 9B is a flow chart showing an operation when the on-board device of the train instructs the station I/F device to release the branch. The train 2A travels on the traveling route secured for the train 2A itself, and passes through the railroad switch 51. The on-board device 10 (the train traveling control section 90) of the train 2A checks its own position (S221). Then, the on-board device 10 determines whether or not the train 2A has passed through the railroad switch 51 (Step S222). When having passed (Step S222: Yes), the on-board device 10 (the train traveling control section 90) issues a railroad switch release command (Step S223) to the station I/F device 20 (Steps S224-1/S224-2). When receiving the railroad switch release command, the station I/F device 20 (the railroad switch operating section 25) outputs a railroad switch release signal to the railroad switch 51 or sets the railroad switch switching command signal to a low level (Steps S225/S226). As a result, the locked state of the railroad switch 51 is released (Steps S227/S228). The railroad switch 51 outputs a release signal indicating the release of the lock state, to the station I/F device 20 (Steps S229/S230). The station I/F device 20 (the railroad switch operating section 25) erases (Steps S231/S232) the stored railroad switch switching command and outputs an erasure confirmation data to the on-board device 10 of the train 2A (Steps S233/S234).

In the present embodiment, the on-board device 10 of the train 2 can carry out the train interval protection in the normal mode by receiving the train related data from the different train 2, by receiving the station related data from the station I/F device 20 of the station 3, and by communicating with the station I/F device 20 according to necessity. That is, in the on-board device 10, mainly, the traveling route securement determining section 70 secures a traveling route (the traveling route protection) and the traveling determining section 80 can permit a passage (the crash protection). As a result, by providing the function of the train interval protection to the on-board device 10, it becomes unnecessary to provide the ATP ground device 232, the station control device 234 and the interlocking device 236 to the control center, unlike the configuration of FIG. 1. Thus, a space for the ATP ground device 232, the station control device 234 and the interlocking device 236 can be reduced and, also, the reduction of the introduction cost becomes possible. Moreover, the maintainability of the equipment can be improved. Moreover, because the train interval protection is carried out by the on-board device as a main device, so that the work of a command issuing member of the control center is changed from the conventional monitoring and controlling operations to the monitoring operation, the work load of the command issuing member and the skill required to the member can be made lower.

Also, the branch control in the present embodiment can be regarded as, mainly, steps S23 to S39 in the above train interval protection. In this case, in the branch control of the present embodiment, a series of sequences of the departure and arrival control and the controls from the traveling route establishment to the traveling permission can be realized by the cooperation of the on-board device 10 with the station I/F device 20. Thus, the time until the train 2 starts to travel from the station 3 can be reduced. In this way, the function of the branch control can be accomplished by the on-board device 10 and the station I/F device 20. Thus, the reduction of the space for the devices in the control center and the cost reduction can be accomplished. Moreover, because the on-board device 10 and the station I/F device 20 narrow a sequence range, a process time to the railroad switch switching can be shortened. That is, because the time until the train 2 leaves the station 3 can be reduced, the transportation capacity can be reinforced.

Second Embodiment

The signaling system according to a second embodiment of the present invention will be described. In the present embodiment, the train interval protection in case of inter-station traveling of the train 2 in an operation with a failure (a failure mode) in the signaling system having the configuration described in the first embodiment will be described. Below, different points from the first embodiment will be mainly described.

1. Configuration

The control device of the on-board device 10 will be described.

Figure 10:
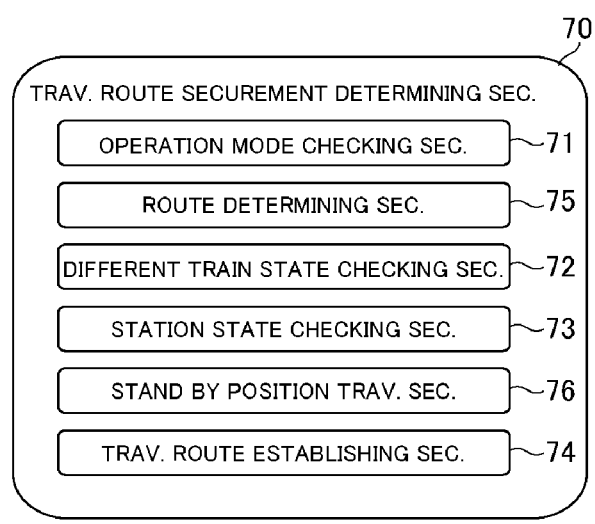
FIG. 10 is a block diagram showing a configuration example of a traveling route securement determining section of the control device in the signaling system according to a second embodiment.

FIG. 10 is a block diagram showing a configuration example of the traveling route securement determining section 70 of the control device of the signaling system according to the present embodiment. The traveling route securement determining section 70 is further provided with a route determining section 75 and a standby position traveling section 76 in addition to the configuration of FIG. 4A. The route determining section 75 determines a route to avoid a failure part when a failure has occurred in the intermediate section between the stations. The standby position traveling section 76 makes the train 2 travel to a predetermined standby position, when the train travels on the route to avoid the failure part but the route competes against that of the different train 2 in a part of the route.

2. Operation

Next, the operation of the signaling system according to the present embodiment will be described. In this case, as the operation of the signaling system, the train interval protection in the inter-station traveling of the train 2 in case of the operation at the time of occurrence of a failure (the failure mode) will be described.

The state of the railroad line to which the signaling system is applied will be described previously to the description of a specific operation.

Figure 11:
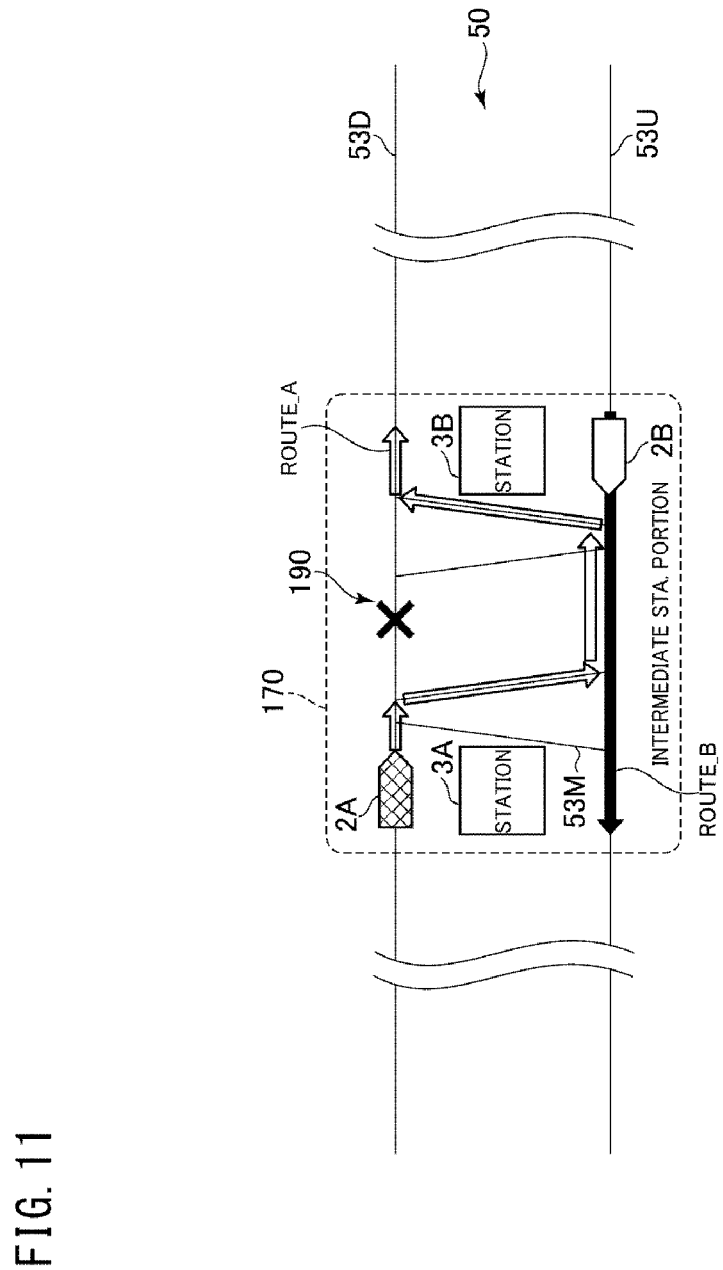
FIG. 11 is a diagram schematically showing the state of a railroad line to which the signaling system according to the second embodiment is applied.

FIG. 11 is a diagram schematically showing the state of the railroad line to which the signaling system according to the present embodiment is applied. FIG. 11 shows the intermediate station portion 170 in FIG. 6. In the intermediate station portion 170, it is shown that the failure has occurred in the intermediate station portion between the station 3A and the station 3B. In other words, it is shown that a failure section 190 has occurred on the railroad track 53D of the outbound line. In this case, the train 2A of the outbound line in the station 3A must take a route Route_A in order to avoid the failure section 190 in case of traveling to the station 3B. Here, the route Route_A enters from the railroad track 53D of the outbound line to the railroad track 53U of the inbound line through the crossover 53M, and returns to the railroad track 53D through another crossover 53M after traveling on the railroad track 53U. On the other hand, the train 2B on the inbound line in the station 3B tries to take the route Route_B just as it is on the railroad track 53U of the inbound line. In this case, the train 2A in the station 3A competes against the train 2B in the station 3B in a part of the route. Below, the operation of the signaling system in the condition of such a railroad line will be described.

Next, a scene of the train interval protection in the state of the railroad line shown in FIG. 11 (in case of occurrence of the failure) will be described.

Figure 12:
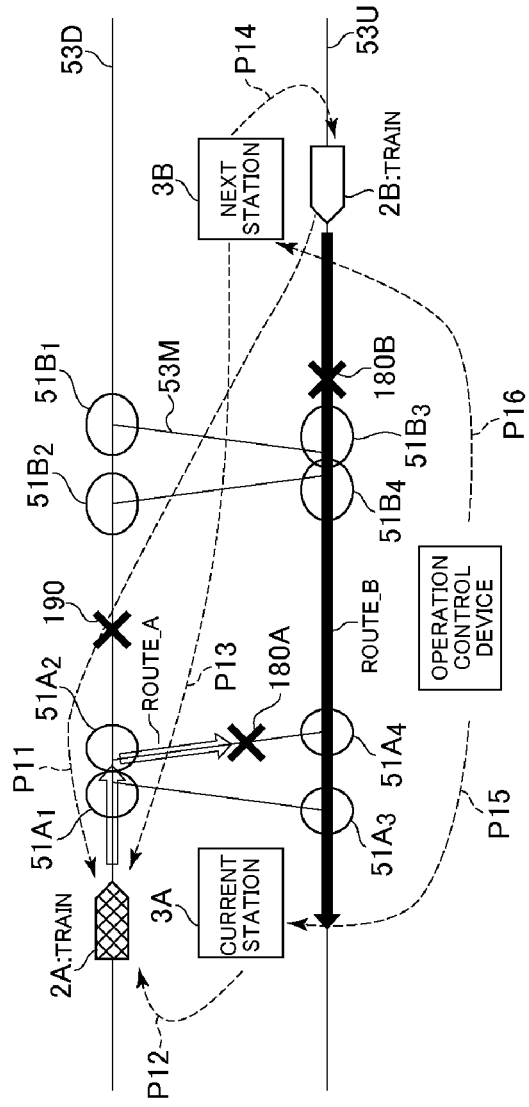
FIG. 12 is a diagram schematically showing a scene of train interval protection in case of inter-station traveling of the train at a time of generation of a failure section.

FIG. 12 is a diagram schematically showing the scene of the train interval protection in case of inter-station traveling of the train at the time of the failure section occurrence. In FIG. 12, an attention should be paid to the inter-station traveling train 2A in the intermediate station portion 170, like FIG. 7. The stations 3 (3A and 3B), the railroad tracks 53 (53U and 53D) and the railroad switches 51 (51A1 to 51A4, and 51B1 to 51B4) are the same as those of FIG. 7. It is supposed that the train 2A in the station 3A does not travel on the railroad track 53D of the outbound line just as it is, and travels on the route Route_A to avoid the failure section 190. It is supposed that the train 2B in the station 3B takes the route Route_B on the railroad track 53U of the inbound line just as it is.

As mentioned above, when the failure has occurred on the way of the intermediate station portion 170 (the failure section 190) between the stations, the operation control device 30 first instructs the current station 3A and the next station 3B to change the operation mode. The station I/F devices 20 of the current station 3A and the next station 3B check the on-rail clearance between the stations and then notify the changed operation mode to the trains 2A and 2B in the stopped state at the stations 3A and 3B. The trains 2A and 2B recognize that the traveling routes are the route Route_A and the route Route_B, respectively. The traveling direction of the train 2A and that of the train 2B are opposite to each other and the requested traveling routes compete in a branch section between the railroad switch 51A4 and the railroad switch 51B4. Therefore, the competition must be avoided while the train 2A and the train 2B adjust the traveling route each other. The train 2A checks the state of the train 2B which has stopped at the next station 3B and the switching position states of the railroad switches 51 on the route Route_A before the departure. When the train 2B has acquired a traveling route on the route Route_B, the train 2A advance to a location where the train 2A does not collide with the train 2B (the traveling permission limit position 180A of the train 2A). The train 2A switches the switching positions of the railroad switches 51 along the route Route_A at the timing that the train 2B approaches the current station 3A beyond the traveling permission limit position 180A. Oppositely, when the train 2A acquires the route Route_A as the traveling route before the train 2B acquires, the train 2B waits for passage of the train 2A in front of the traveling permission limit position 180B for the train 2B until the train 2A has passed through the traveling permission limit position 180B for the rain 2B. The trains 2A and 2B continue the monitoring of the states of the acquired traveling routes and the railroad switch switching positions on the acquired traveling routes until the train 2 on the opposite side has passed through the traveling permission limit position.

Next, the train interval protection in case of the inter-station traveling of the train 2 in the operation at the time of occurrence of the failure (the failure mode; the state of the railroad in FIG. 11) will be specifically described.

Figure 13:
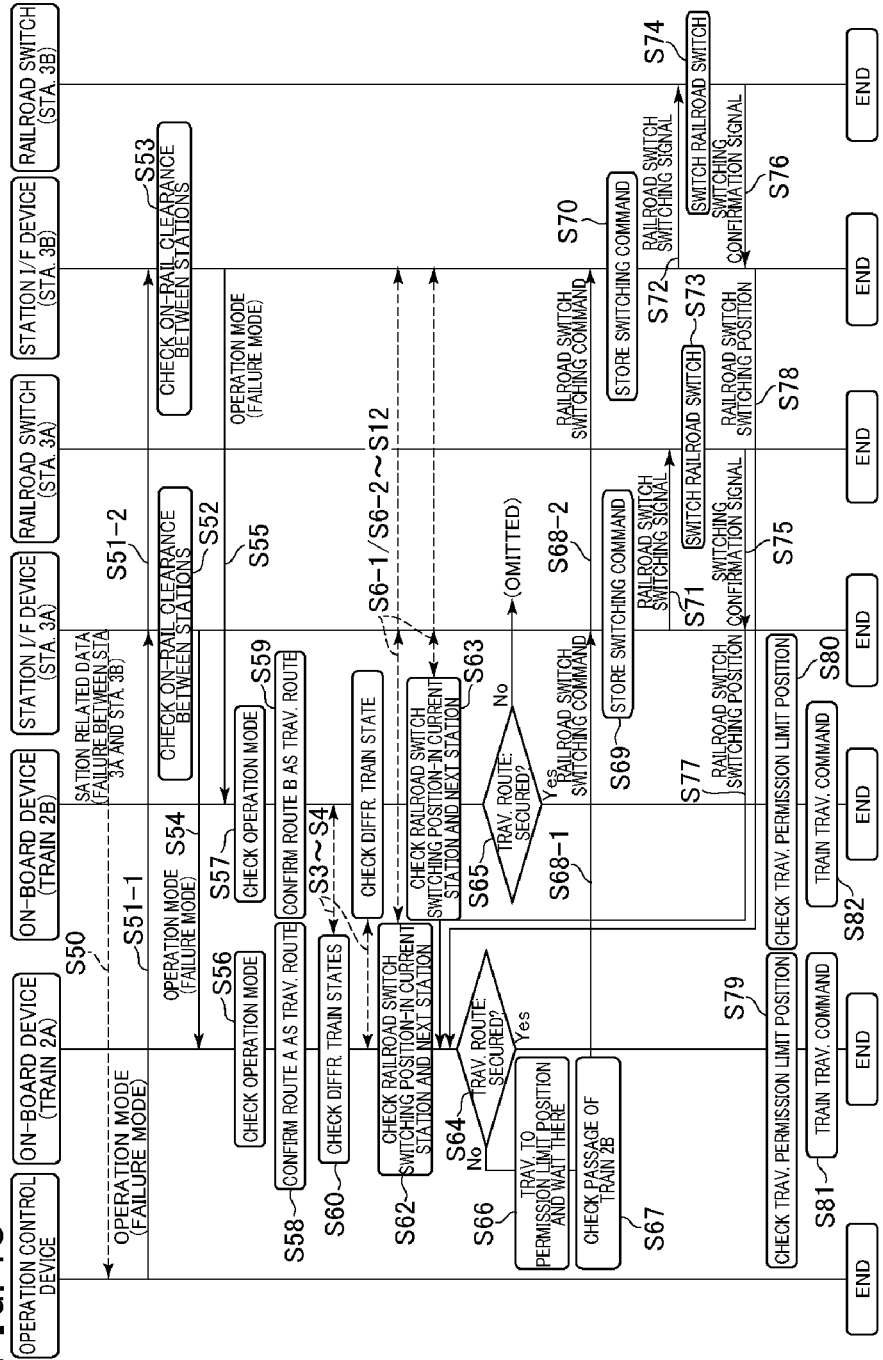
FIG. 13 is a flow chart showing an operation of the train interval protection in case of inter-station traveling of the train at a time of generation of the failure.

FIG. 13 is a flow chart showing the operation of the train interval protection in case of inter-station traveling of the train in the operation at the time of occurrence of the failure. The on-board device 10 of the train 2 carries out the traveling route securement and the traveling permission by the train 2 itself based on the exchange of data with the above-mentioned different devices (a plurality of different on-board devices 10, a plurality of station I/F devices 20, and the operation control device 30). Here, the attention should be paid to the on-board device 10 of the train 2A in FIG. 12.

The station I/F device 20 of the station 3A (or the station 3B) recognizes that the failure has occurred between the station 3A and the station 3B (failure section 190) by an input of the user or a detection of a sensor, and transmits it to the operation control device 30 of the control center 4 as the station related data (the inter-station section state data (Step S50).

The operation control device 30 changes the operation mode from the normal mode to the failure mode (failure section 190). Then, the operation control device 30 transmits the changed operation mode (the failure mode: the failure section 190) to the station I/F devices 20 of all the stations 3 (containing the station 3A and the station 3B) (Steps S51-1/S51-2).

The station I/F device 20 of the station 3A checks the on-rail clearance among the stations (Step S52), notifies that the operation mode has been changed to the failure mode (failure section 190) to the train 2A which has been stopped in the station 3A (Step S54). In the same way, the station I/F device 20 of the station 3B checks the on-rail clearance between the stations (Step S53) and notifies that the operation mode has been changed to the failure mode (failure section 190), to the train 2B which has been stopped in the station 3B (Step S55).

The on-board device 10 (the operation mode checking section 71) of the train 2A checks that the received operation mode is the failure mode (failure section 190) and stores as the operation mode in the storage unit 12 (Step S56). Thus, it is recognized that the next operation of the train 2A is not the operation of the normal mode (the traveling route for the next station 3B on the railroad track 53D). In the same way, the on-board device 10 (the operation mode checking section 71) of the train 2B checks that the received operation mode is the failure mode (failure section 190) and stores as the operation mode in the storage unit 12 (Step S57). Thus, it is recognized that the operation of the train 2B is not the operation of the normal mode (the traveling route for the next station 3A on the railroad track 53U).

Next, the on-board device 10 (route determining section 75) of the train 2A calculates the route Route_A as the shortest traveling route to reach the station 3B while avoiding the failure section 190 (Step S58). Then, the on-board device 10 outputs the traveling route securement request (the railroad switch switching command) based on the route Route_A to the station I/F devices 20 of the station 3A and the station 3B, and stores a request time (the traveling route request time) of the traveling route securement. In the same way, the on-board device 10 (route determining section 75) of the train 2B calculates the route Route_B as the shortest traveling route to reach the station 3A while avoiding the failure section 190 (Step S59). Then, the on-board device 10 outputs the request of traveling route securement (the railroad switch switching command) based on the route Route_B to the station I/F devices 20 of the station 3A and the station 3B and stores the request time of the traveling route securement (the traveling route request time). At this time, the station I/F devices 20 of the station 3A and the station 3B accepts the railroad switch switching command with the earlier traveling route request time, and switches the railroad switches 51, and locks the railroad switches 51, as in the step S26 to step S37 in FIG. 9A. However, the request time of the traveling route securement (the traveling route request time) may be the times when the station I/F devices 20 receive the requests of the traveling route securement transmitted from the train 2A and the train 2B. In such a case, the station I/F device 20 necessarily replies the reception time of the request of the traveling route securement to the train 2A and the train 2B regardless of the existence or non-existence of the reception of the traveling route request.

Next, the on-board device 10 of the train 2A (the different train state checking section 72) checks the state of the different train 2 (the train 2B) (Step S60). For example, this step may be executed as at the step S3 to step S5 in FIG. 8. Thus, the train related data P11 of the train 2B (the traveling permission limit position, the arrival scheduled platform, the traveling direction, the traveling route, the traveling line, the operation mode, and the traveling route request time) is acquired. Based on the operation mode, it is possible to check whether or not the train 2B is in the failure mode. The next destination (the station 3A) of the train 2B can be confirmed based on the arrival scheduled platform, the traveling direction, the traveling route, and the traveling line. Based on the traveling permission limit position, the position 180A to which the train 2A can travel can be checked. Based on the traveling route request time, the time when the train 2B requested the traveling route securement to the station I/F devices 20 of the station 3B and the station 3A can be confirmed.

In the same way, the on-board device 10 of the train 2B (the different train state checking section 72) checks the state of the different train 2 (the train 2A) (Step S61). For example, this step can be executed as at the step S3 to step S5 in FIG. 8. Thus, as in the case of the train 2A, the train related data of the train 2A (the traveling permission limit position, the arrival scheduled platform, the traveling direction, the traveling route, the traveling line, the operation mode, and the traveling route request time) is acquired.

Next, the on-board device 10 of the train 2A (the station state checking section 73) checks the states of the stations 3 (the station 3A and the station 3B) (Step S62). For example, this step can be executed as at the steps S6-1/S6-2 to step S12 in FIG. 8. Thus, the station related data P12 and P13 (the railroad switch switching position, the inter-station section state) are acquired. Based on the inter-station section state, it is possible to confirm whether or not there is a failure in the inter-station section. Based on the railroad switch switching position, it is possible to confirm whether or not the switching positions of the railroad switches 51A1, 51A2, 51A4, 51B4, 51B3, 51B1 which are on the route Route_A as the traveling route of the train 2A are secured.

In the same way, the on-board device 10 of the train 2B (the station state checking section 73) confirms the states of the stations 3 (the station 3A, the station 3B) (Step S63). For example, this step can be executed as at the step S6-1/S6-2 to step S13 in FIG. 8. Thus, like a case of the train 2A, the station related data (the railroad switch switching position, and the inter-station section state) are acquired.

Next the on-board device 10 of the train 2A (the traveling route establishing section 74) determines whether the traveling route of the train 2A has been secured, based on the railroad switch switching positions of the station related data P12, P13 (Step S64). That is, it is determined whether or not the switching positions of the railroad switches 51A1, 51A2, 51A4, 51B4, 51B3, and 51B1 obstruct the traveling of the train 2A from the current station 3A to the next station 3B. Specifically, it is determined whether or not the railroad switches 51 have been secured and locked in response to the railroad switch switching command from the train 2A. At this time, it is checked whether or not the traveling route request time of the train 2A is earlier than the traveling route request time of the train 2B.

When the traveling route request time of the train 2A is later than the traveling route request time of the train 2B so that the traveling route of the train 2A has not been secured (Step S64: No), the on-board device 10 of the train 2A (standby position traveling section 76) travels to the traveling permission limit position 180A (for the branch) in case of the failure. Then, the on-board device 10 stands by until the traveling of the train 2B ends (Step S66). For example, when that the traveling route request time of the train 2A is later than the traveling route request time of the train 2B, the train 2A cannot secure the traveling route because the railroad switches 51 are already locked by the station I/F device 20. Note that the locking state is maintained until the train 2B passes the railroad switches 51 and the train 2B outputs the railroad switch release command to the station I/F device 20. The station I/F device 20 releases the locking state in response to the reception of the railroad switch release command from the train 2B. In this way, by traveling to the traveling permission limit position 180A and standing by there, the travel time to the station 3B by the train 2A can be reduced while securing the safety. The standby position traveling section 76 confirms based on the train related data of the train 2B that the train 2B passes through a position preceding to the traveling permission limit position 180A, and there is no problem even if the train 2A enters the railroad track 53U (Step S67).

Note that at step S66, the train 2A may generate a speed pattern such that the train 2A does not pass the traveling permission limit position before a time when the train 2B passes the branch. In this case, the train 2A does not stop at the traveling permission limit position 180A, and travels slowly on the traveling route in front of the position 180A without waiting. By making such an operation, the power efficiency for traveling of the vehicle is improved, compared with a case to stop the vehicle for the standby and then to drive a motor of the vehicle again.

After that, the on-board device 10 of the train 2A (the traveling route establishing section 74) outputs the railroad switch switching command to the station I/F device 20 of the station 3 (the station 3A, the station 3B) to which the railroad switches 51 (51A1, 51A2, 51A4, 51B4, 51B3, and 51B1) to be switched belong (Step S68-1/S68-2). The station I/F device 20 (the railroad switch operating section 25) stores the railroad switch switching command in the station storage unit 22 in relation to the train 2A (Steps S69/S70). Then, in response to the railroad switch switching command, the station I/F device 20 outputs the railroad switch switching signal to the targeted railroad switches 51 (51A1, 51A2, 51A4, 51B4, 51B3, and 51B1) (Steps S71/S72). The targeted railroad switches 51 (51A1, 51A2, 51A4, 51B4, 51B3, and 51B1) are switched in response to the railroad switch switching signal (Steps S73/S74), and outputs switching confirmation signals to the station I/F device 20 (Steps S75/S76). The station I/F device 20 (the railroad switch operating section 25) outputs the railroad switch switching positions to the on-board device 10 of the train 2A in response to the switching confirmation signals (Steps S77/S78). At this time, because the railroad switch switching command is stored in the station storage unit 22, the railroad switches 51 are locked by the station I/F device 20 (the railroad switch operating section 25). Note that the locked state is maintained until the train 2A passes the railroad switch 51 and the train 2A outputs the railroad switch release command to the station I/F device 20. The station I/F device 20 releases the locked state in response to the reception of the railroad switch release command from the train 2A. The traveling route establishing section 74 determines whether or not the traveling route of the train 2A has been ensured in response to the railroad switch switching position (Step S64). When the traveling route has been secured (containing a case where the traveling route request time of the train 2A is earlier than the traveling route request time of the train 2B) (Step S64: Yes), the process advances towards step S79. Thus, the train 2A completes the traveling route securement.

Note that at step S64, when the traveling route request time of the train 2A is earlier than the traveling route request time of the train 2B, the process of steps S68-1/68-2 to step S78 may be necessarily executed for the first time regardless of whether or not the traveling route has been secured (not shown). That is, the commands (the railroad switch switching command) of switching and retaining (locking) may be necessarily outputted to (the station I/F device 20 of) the railroad switches 51 on the traveling route once. Thus, the traveling route can be more surely secured.

In the same way, the on-board device 10 of the train 2B (the traveling route establishing section 74) determines whether or not the traveling route of the train 2B has been secured, based on the railroad switch switching positions of the station related data (Step S65). The subsequent process is the same as the case of the train 2A (Step S66 to Step S78). However, in case of the train 2B, when waiting, the train 2B waits in the traveling permission limit position 180B (for branch) in case of the failure.

Next, the on-board device 10 of the train 2A (the traveling permission limit position checking section 81) checks the traveling permission limit position (Step S79). In this step, regardless of the traveling route request time, the traveling permission limit position does not exist for the train 2A in the relation to the train 2B. However, when a different train 2 exists on the railroad track 53D of the outbound line in the station 3B, the traveling permission limit position associated with the different train 2 exists.

Next, the on-board device 10 of the train 2A (the speed profile generating section 94) generates the speed limit profile to be followed by the train 2A when the train 2A travels from the current position to the next station 3B in the failure mode based on a distance from the targeted train 2 to the traveling permission limit position (not shown). After that, the on-board device 10 of the train 2A (the traveling section 91) starts traveling of the train 2A for the next station 3B based on the basic data 134 while referring to the speed limit profile (Step S81).

In the same way, the on-board device 10 of the train 2B (the traveling permission limit position checking section 81) checks the traveling permission limit position (Step S80). Next, the on-board device 10 of the train 2B (the speed profile generating section 94) generates a speed limit profile based on a distance from the targeted train 2 to the traveling permission limit position (not shown). After that, the on-board device 10 of the train 2B (the traveling section 91) starts the traveling of the train 2B for the next station 3A based on the basic data 134 while referring to the speed limit profile (Step S82).

As mentioned above, the train interval protection is carried out in case of inter-station traveling of the train in the operation in case of generation of the failure.

In the present embodiment, the on-board device 10 of the train 2 can carry out the train interval protection in the failure mode, by receiving the train related data from the different train 2, receiving the station related data from the station I/F device 20 of the station 3, and communicating with the different train 2 and the station I/F device 20 according to necessity. That is, in this case, the same effect as in the first embodiment can be accomplished.

Third Embodiment

The signaling system to according a third embodiment of the present invention will be described. In the present embodiment, in the signaling system which has the configuration described in the second embodiment, the train interval protection will be described in case of inter-station traveling of the train 2 in the normal mode in the end station section. Below, the difference points from the second embodiment will be mainly described.

1. Configuration

The configuration of the present embodiment is the same as that of the signaling system according to the second embodiment.

2. Operation

Next, the operation of the signaling system according to the present embodiment will be described. In this case, as the operation of the signaling system, the train interval protection will be described in case of inter-station traveling of the train 2 in the end station section in the normal mode.

The state of the railroad line to which the signaling system is applied will be described before the explanation of the operation.

Figure 14:
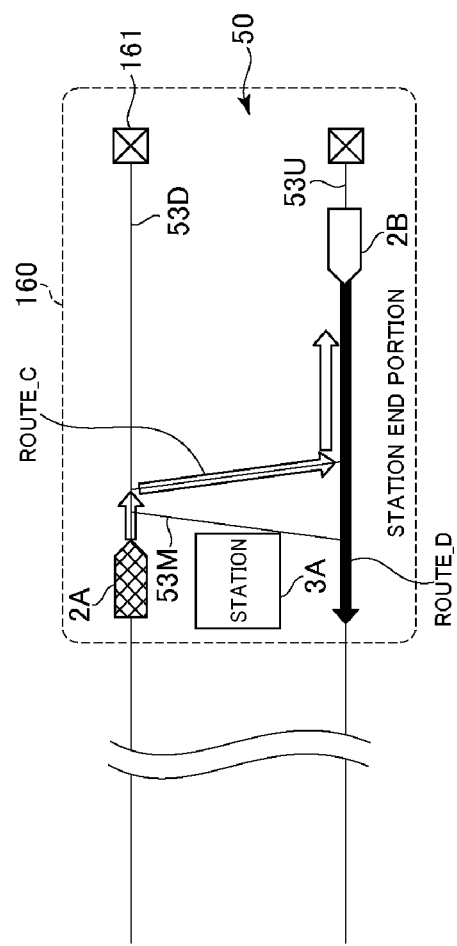
FIG. 14 is a diagram schematically showing a state of a railroad line to which the signaling system according to a third embodiment is applied.

FIG. 14 is a diagram schematically showing the state of the railroad line to which the signaling system according to the present embodiment is applied. FIG. 14 shows the end station portion 160 in FIG. 6. In the end station portion 160, the station 3A is a terminal (departure) station 3 and the track ends 161 are provided for the railroad track 53D and the railroad track 53U at the end of the station 3A. In this case, the train 2A on the railroad track 53D of the outbound line in the station 3A must take a route Route_C in order to travel onto the railroad track 53U of the inbound line for the purpose of a shuttle operation. Here, the route Route_C is a route entering from the railroad track 53D of the outbound line to the railroad track 53U of the inbound line through the crossover 53M, and traveling on the railroad track 53U to the track end 161. On the other hand, the train 2B exists in the track end 161 of the railroad track 53U of the inbound line, and tries to travel on the railroad track 53U of the inbound line just as it is, as the route Route_D. In this case, the train 2A on the outbound line in the station 3A competes with the train 2B on the inbound line in a part of the route. Below, the operation of the signaling system in such a railroad line condition will be described.

Next, a scene of the train interval protection in the state of the railroad line of FIG. 14 (normal mode (end station portion)) will be described.

Figure 15:
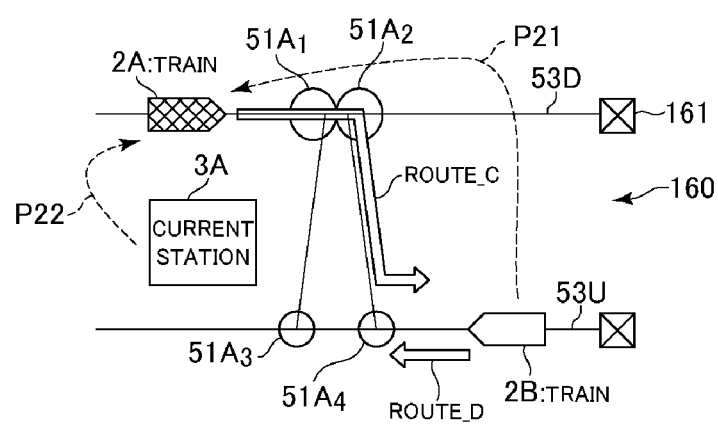
FIG. 15 is a diagram schematically showing a scene of the train interval protection in case of inter-station traveling of the train in an end station portion.

FIG. 15 is a diagram schematically showing the scene of the train interval protection in case of inter-station traveling of the train in the end station portion. In FIG. 15, the attention should be paid to the train 2A heading for the track end 161 from the station 3A in end station portion 160. It is supposed that the train 2A in the station 3A travels on the route Route_C from the railroad track 53D of the outbound line to the railroad track 53U of the inbound line. It is supposed that the train 2B at the track end 161 travels on the railroad track 53U of the inbound line as the route Route_D just as it is to head for the station 3A. It is supposed that the railroad switches 51 of the current station 3A are referred to as the railroad switches 51A1 and 51A2 on the railroad track 53D and as the railroad switches 51A3 and 51A4 on the railroad track 53U, in order from the side near the station 3A. The train related data P21 and the station related data P22 are transmitted to the train 2A from the train 2B and the station 3A.

The operations of the train 2A and the train 2B in this case are the same as those of the second embodiment except that the train 2B has to travel earlier (the train 2B has a priority) and the train 2A do not cross to the railroad track 53D (route Route_C) again. That is, in the second embodiment, regarding the control of FIG. 13, a case where the step S64 is necessarily set to a No state and step S65 is necessarily set to a YES state can be considered. This is determined from the facts that the station 3A is the station 3 of the end station portion 160 and the operation mode is the normal mode.

In this way, in the end station portion 160, the train 2 can carry out a shuttle operation.

In this case, too, the effects of the first and second embodiments can be obtained.

The program and the data configuration of the present invention are recorded on a computer-readable storage medium of the computer and may be read into the information processing unit from the storage medium.

The present invention is not limited to any of the above embodiments, and the above embodiments can be modified appropriately in the range of the technical thought of the present invention.

The present invention has been described with reference to the above embodiments. However, it would be apparent to a person skilled in the art that these embodiments are merely provided to describe the present invention. These embodiments have not to use to interpret the attached claims to limit meaning.

A part or the whole of the above-mentioned embodiments and examples can be described like the following supplemental note, but is not limited below.

The A signaling system of the present invention includes a plurality of on-board devices, a plurality of station interface devices and a plurality of branches. The plurality of on-board devices are provided for a plurality of moving vehicles traveling on a track. The plurality of station interface devices are provided for a plurality of stations along the track. The plurality of branches are provided onto the track and controlled by the plurality of station interface devices. A second on-board device of a second moving vehicle of the plurality of moving vehicles which is on a traveling route of a first moving vehicle of the plurality of moving vehicles transmits different moving vehicle related data which indicates data of the second moving vehicle, to a first on-board device of the first moving vehicle. A first station interface device of the plurality of station interface devices which controls a branch on the traveling route, transmits station related data which indicates data of the branch on the traveling route, to the first on-board device. The first on-board device outputs a command of maintenance of a state of the branch on the traveling route or switching and maintenance of the branch state to the first station interface device, to secure the traveling route based on the different moving vehicle related data and the station related data. The first station interface maintains or switches and maintains the state of the branch on the traveling route to secure the traveling route. The first on-board device determines the traveling of the first moving vehicle on the secured traveling route based on the different moving vehicle related data.

In the signaling system of the present invention which has such a configuration, the branch is accurately controlled by making the on-board device and the station interface cooperate, to realize a series of sequences from the departure and arrival control and the traveling route establishment to the traveling permission. Thus, the time until the train 2 starts traveling from the station 3 can be reduced and the improvement of a transportation capacity can be attained. Also, because the function of the branching control can be realized by the on-board device and the station I/F device without passing through the control center, the processing efficiency can be increased and the devices of the control center (the ATP ground device, the station control device, and the interlocking device) can be made unnecessary. Thus, the space for the devices and so on can be reduced, the facility cost can be reduced and the treatment of the equipment becomes easy.

In the above-mentioned signaling system, the first on-board device may inquire the different moving vehicle related data to the second on-board device to acquire the different moving vehicle related data. Also, the first on-board device may inquire the station related data to the first station interface device to acquire the station elated data.

In the signaling system of the present invention which has such a configuration, the on-board device itself can inquire and acquire the different moving vehicle related data and the station related data. That is, the inquiry and the acquisition of the data necessary when securing a traveling route (the traveling route protection) can be carried out without passing through the control center.

In the above signaling system, the first on-board device checks whether the traveling route has been secured, based on the station related data and the different moving vehicle related data, and may output a command to the first station interface device when the traveling route has not been secured.

In the signaling system of the present invention which has such a configuration, the traveling route can be surely secured (the traveling route protection can be carried out) in response to the command of the on-board device without passing through the control center.

In the above signaling system, the different moving vehicle related data may include a traveling permission limit position data indicating a range where the moving vehicle succeeding to the second moving vehicle is permitted to travel.

The first on-board device may determine the traveling of the first moving vehicle in the range where the traveling is permitted, based on the traveling permission limit position data.

In the signaling system of the present invention which has such a configuration, because the on-board device of the moving vehicle determines the traveling of the moving vehicle in a passage permission range succeeding to the different moving vehicle, any collision with the different moving vehicle never occurs. Also, because a permission range is set in a range between the moving vehicle and the different moving vehicle (e.g. regarding a distance), it is not necessary to provide a conventional block section and so on and the facilities can be simplified.

The above signaling system may further include a radio LAN configured to connect the plurality of on-board devices and the plurality of station interface devices to be bi-directionally communicable. The first on-board device may acquire the different moving vehicle related data and the station related data through the radio LAN.

In the signaling system of the present invention which has such a configuration, data such as the different moving vehicle related data and the station related data can be transmitted and received at high speed by the communication of the radio LAN.

The present invention is related to a control method of a moving vehicle by using a signaling system. The signaling system includes a plurality of on-board devices provided for a plurality of moving vehicles which travel on a track; a plurality of station interface devices provided for a plurality of stations along the track; and a plurality of branches provided on the track and controlled by the plurality of station interface devices. The control method of the moving vehicle, includes transmitting different moving vehicle related data which indicates data of a second moving vehicle, to a first on-board device of a first moving vehicle from a second on-board device of the second moving vehicle which is on a traveling route of the first moving vehicle of the plurality of moving vehicles; transmitting station related data which indicates data of a branch on the traveling route, to the first on-board device from a first station interface device, which controls the branch on the traveling route, of the plurality of station interface devices; outputting a command for maintenance or switching and maintenance of a state of the branch on the traveling route to the first station interface device from the first on-board device, to secure the traveling route based on the different moving vehicle related data and the station related data; securing the traveling route by maintaining or switching and maintaining the state of the branch on the traveling route by the first station interface device; and determining the traveling of the moving vehicle on the secured traveling route by the first on-board device based on the different moving vehicle related data.

In the control method of the moving vehicle of the present invention which has such a configuration, a series of sequences of the departure and arrival control, and from the traveling route establishment to the traveling permission can be realized by controlling the branches accurately through cooperation of the on-board devices and the station interface devices. Thus, the time until the train 2 starts traveling from the station 3 can be reduced so as to enforce the transportation capacity. Also, because the function of the branch control can be realized by the on-board device and the station I/F device without passing through the control center, the processing can be made efficient and the devices of the control center (the ATP ground device, the station control device, and the interlocking device) can be made unnecessary. In this way, the space for the devices and so on can be reduced, the facility cost can be reduced, and the treatment of the equipment becomes easy.

In the above control method of the moving vehicle, the securing the traveling route may include: inquiring the different moving vehicle related data to the second on-board device from the first on-board device to acquire the different moving vehicle related data; and inquiring the station related data to the first station interface device from the first on-board device to acquire the station related data.

In the control method of the moving vehicle of the present invention which has such a configuration, the on-board device may inquire and acquire the different moving vehicle related data and inquires and acquires the station related data. That is, the inquiry and the acquisition of the data necessary when the traveling route securement (the traveling route protection) can be carried out without passing through the control center.

In the above control method of the moving vehicle, the outputting the command may include: checking whether the traveling route has been secured, based on the station related data and the different moving vehicle related data by the first on-board device, and outputting the command to the first station interface device when the traveling route is not secured.

In the control method of the moving vehicle of the present invention which has such a configuration, the traveling route (the traveling route protection) can be surely secured in response to the command of the on-board device without passing through the control center.

In the above control method of the moving vehicle, the different moving vehicle related data may include a traveling permission limit position data indicating a range where the moving vehicle succeeding to the second moving vehicle is permitted to travel. The determining the traveling may include: determining the traveling of the moving vehicle in the range where the traveling is permitted, based on the traveling permission limit position data by the first on-board device.

In the control method of the moving vehicle of the present invention which has such a configuration, because the on-board device of the moving vehicle determines the traveling of the moving vehicle in a passage permission range succeeding to the different moving vehicle, any collision with the different moving vehicle never occurs. Also, because a permission range is set in a range (e.g. the distance) between the moving vehicle and the different moving vehicle, it is not necessary to provide a conventional block section and so on and the facilities can be simplified.

In the above-mentioned control method of the moving vehicle, the first on-board device may be further provided with a step of acquiring the different moving vehicle related data and the station related data through the radio LAN.

The control method of the moving vehicle of the present invention which has such a configuration can transmit and receive data such as the different moving vehicle related data and the station related data at a high speed by the communication of the radio LAN.

The invention claimed is:

1. A signaling system comprising:
    a plurality of on-board devices respectively provided in a plurality of moving vehicles traveling on a track, and including a first on-board device and a second on-board device, wherein the plurality of moving vehicles comprises a first moving vehicle having the first on-board device and a second moving vehicle having the second on-board device;
    a plurality of station interface devices respectively provided in a plurality of stations along the track, and including a first station interface device of a first station; and
    a plurality of switches provided on the track, wherein first switches of the plurality of switches belong to the first station interface device and are controlled by the first station interface device,
    wherein the second on-board device of the second moving vehicle which is on a traveling route of the first moving vehicle transmits second moving vehicle related data including data related to a position of the second moving vehicle, to the first on-board device of the first moving vehicle in response to a moving vehicle inquiry command from the first on-board device,
    wherein the first station interface device transmits station related data including state data indicative of states of the first switches on the traveling route to the first on-board device in response to a switch inquiry command from the first on-board device,
    wherein the first on-board device outputs a maintenance command or a switching and maintenance command for the first switches to the first station interface device to secure the traveling route based on the second moving vehicle related data and the station related data,
    wherein the first station interface device controls the first switches to maintain or switch and maintain the states of the first switches on the traveling route in response to the maintenance command or the switching and maintenance command from the first on-board device, and
    wherein the first on-board device determines the traveling of the first moving vehicle on the secured traveling route based on the second moving vehicle related data.

2. The signaling system according to claim 1, wherein the first on-board device checks whether the traveling route has been secured, based on the station related data and the second moving vehicle related data, and outputs the maintenance command or the switching and maintenance command to the first station interface device when the traveling route has not been secured.

3. The signaling system according to claim 1, wherein the second moving vehicle related data includes traveling permission limit position data indicating a position to which the first moving vehicle succeeding to the second moving vehicle is permitted to travel, and
    wherein the first on-board device determines the traveling of the first moving vehicle to the position where the traveling is permitted, based on the traveling permission limit position data.

4. The signaling system according to claim 1, further comprising:
    a radio LAN configured to connect the plurality of on-board devices and the plurality of station interface devices to be bi-directionally communicable,
    wherein the first on-board device acquires the second moving vehicle related data and the station related data through the radio LAN.

5. A control method of moving vehicles by using a signaling system, wherein the signaling system comprises:
    a plurality of on-board devices respectively provided in a plurality of moving vehicles which travel on a track;
    a plurality of station interface devices respectively provided in a plurality of stations along the track; and
    a plurality of switches provided on the track,
    wherein the control method of the moving vehicles comprises:
    transmitting second moving vehicle related data including data related to a position of a second moving vehicle of the plurality of moving vehicles, to a first on-board device of a first moving vehicle from a second on-board device of the second moving vehicle which is on a traveling route of the first moving vehicle in response to a moving vehicle inquiry command from the first on-board device;
    transmitting station related data including states data of first switches of the plurality of switches on the traveling route, to the first on-board device from a first station interface device of the plurality of station interface devices in response to a switch inquiry command from the first on-board device;
    outputting a maintenance command or a switching and maintenance command for the first switches to the first station interface device from the first on-board device to secure the traveling route based on the second moving vehicle related data and the station related data;
    controlling the first switches to maintain or switch and maintain the states of the first switches on the traveling route by the first station interface device in response to the maintenance command or the switching and maintenance command from the first on-board device; and
    determining the traveling of the first moving vehicle on the secured traveling route by the first on-board device based on the second moving vehicle related data.

6. The control method of the moving vehicle according to claim 5, wherein the outputting the maintenance command or the switching and maintenance command comprises:
    checking whether the traveling route has been secured, based on the station related data and the second moving vehicle related data by the first on-board device, and outputting the maintenance command or the switching and maintenance command to the first station interface device when the traveling route has not been secured.

7. The control method of the moving vehicle according to claim 5, wherein the second moving vehicle related data includes traveling permission limit position data indicating a position to which the first moving vehicle succeeding to the second moving vehicle is permitted to travel, and wherein the determining the traveling comprises:

determining the traveling of the first moving vehicle to the position where the traveling is permitted, based on the traveling permission limit position data by the first on-board device.

8. The control method of the moving vehicle according to claim 5, further comprising:

acquiring the second moving vehicle related data and the station related data through a radio LAN by the first on-board device.

* * * * *